RANDOM ACCESS DATA STORAGE APPARATUS

Original Filed June 24, 1957

INVENTOR.
WARD W. BEMAN
BY
R. E. Geauque
Attorney

Nov. 26, 1968 W. W. BEMAN 3,413,628

RANDOM ACCESS DATA STORAGE APPARATUS

Original Filed June 24, 1957 16 Sheets-Sheet 2

INVENTOR.
WARD W. BEMAN

BY R. E. Geauque
Attorney

INVENTOR.
WARD W. BEMAN
BY
R. E. Geauque
Attorney

INVENTOR.
WARD W. BEMAN
BY
R. E. Geauque
Attorney

INVENTOR.
WARD W. BEMAN
BY
R. E. Grangue
Attorney

INVENTOR.
WARD W. BEMAN
BY
R. E. Geauque
Attorney

INVENTOR.
WARD W. BEMAN
BY R. E. Geaugue
Attorney

RANDOM ACCESS DATA STORAGE APPARATUS

Original Filed June 24, 1957

INVENTOR.
WARD W. BEMAN
BY
R. E. Geauque
Attorney

INVENTOR.
WARD W. BEMAN
BY R.E. Geauque
Attorney

RANDOM ACCESS DATA STORAGE APPARATUS

Original Filed June 24, 1957 16 Sheets-Sheet 10

INVENTOR.
WARD W. BEMAN
BY R. E. Geauque
Attorney

INVENTOR.
WARD W. BEMAN
BY
R. E. Geauque
Attorney

INVENTOR.
WARD W. BEMAN
BY
R. E. Geauque
Attorney

Nov. 26, 1968 W. W. BEMAN 3,413,628

RANDOM ACCESS DATA STORAGE APPARATUS

Original Filed June 24, 1957 16 Sheets-Sheet 13

INVENTOR.
WARD W. BEMAN

BY R. E. Geauque

Attorney

INVENTOR.
WARD W. BEMAN

BY R. E. Geauque

Attorney

RANDOM ACCESS DATA STORAGE APPARATUS

Original Filed June 24, 1957 16 Sheets-Sheet 15

INVENTOR.
WARD W. BEMAN
BY
R. E. Geauque
Attorney

RANDOM ACCESS DATA STORAGE APPARATUS

Original Filed June 24, 1957 16 Sheets-Sheet 16

INVENTOR.
WARD W. BEMAN
BY
R. E. Geauque
Attorney

United States Patent Office 3,413,628
Patented Nov. 26, 1968

3,413,628

RANDOM ACCESS DATA STORAGE APPARATUS

Ward W. Beman, Glendale, Calif., assignor to Whittaker Corporation, a corporation of California
Continuation of application Ser. No. 667,635, June 24, 1957. This application Sept. 26, 1967, Ser. No. 670,809
27 Claims. (Cl. 340—174.1)

This application is a continuation of S.N. 667,635 filed June 24, 1957.

This invention relates to random-access data storage apparatus, and particularly to apparatus for storing a multiplicity of record elements, such as micro-film frames, ferro-electric tapes, magnetizable wires, or magnetizable tapes, having data recorded thereon, for selecting one record element or a sequence of record elements from among said multiplicity of record elements and for recording data on or reading data from said selected record element or elements.

Many modern devices, such as automatic digital computers, require facilities for the storage of large quantities of data for an indefinite period, together with means for selecting a particular segment or segments of the stored data and reading the selected data out at any desired time, without the necessity of hunting through the whole body of stored data to find the desired segment. Also, should it become necessary to delete or add data, such alterations should be capable of being made quickly and conveniently.

A particularly useful type of data storage is in the form of spooled records such as micro-film, magnetic wire, or magnetic tape. It is customary to use such spooled records in the form of substantial lengths supported on reels and to read the data from the record by running it from the storage reel past a reading station and onto another reel. Such an arrangement makes it rather difficult to obtain quick access to any particular segment of data which may be stored in a random position along the length of the record. A substantial amount of time is required to hunt for and locate a particular desired data segment.

It is now proposed, in accordance with the present invention, to use such records in substantially shorter lengths than has been customarily done in the prior art. For example, a record length of approximately three feet has been found to be satisfactory. The present invention provides apparatus for storing a multiplicity of such record lengths in a compact space, mechanism for selecting a particular one of the multiplicity of stored record lengths for reading or for writing, i.e. data storage, and apparatus for scanning the selected record to perform the reading or writing function as required.

An object of the present invention is to provide improved means for storing a multiplicity of short lengths of records.

Another object of the invention is to provide improved means for selecting a particular one of a multiplicity of stored records.

Another object is to provide an improved means for scanning the selected record by effecting a relative motion between the reading or writing station and the record.

Another object is to provide an improved means for guiding the relative movement between the reading or writing station and a length of the record.

The foregoing objects of the invention are attained in the apparatus disclosed herein, by storing the records in a plurality of rows or columns.

In its simplest form, the invention comprises a multiplicity of elongate record elements placed side by side in a two-dimensional array. In the operation of the mechanism, the storage position of the segment sought is defined by Cartesian coordinates. The elongate record elements are disposed upon the surface of the two-dimensional plane defined by these coordinates. The position or location of any given record segment is related to accurately fixed divisions on the X and Y coordinates of the plane. In this simple embodiment of the data storage device, the records may be considered to lie upon a planar surface coated with a recording material having defined rows or columns thereon for addressing the recorded segments. A data address fed to the storage apparatus would direct the reading and writing search head to a particular X–Y coordinate whereupon it would scan the surface along one of the two coordinates, for a distance corresponding to one word length. As the search head scans, it continues to maintain a record of its position; but simultaneously it is detecting data signals derived from the surface, said signals having been previously written upon the surface from a "write" command. Used in this manner, a storage device having a working surface of approximately 1200 square inches could store 20,000 36-digit binary words, based upon a signal packing density of one unit per square millimeter. This density is readily achieved by conventional magnetic recording techniques. For many applications this might be an entirely sufficient amount of storage. However, if an even greater capacity is required further modification can be employed whereby true volumetric storage is achieved. A data address may consist of not only the X–Y coordinates of a two-dimensional plane, but a Z coordinate as well. The reading and writing head might then position itself over the X–Y address as directed by a command from the controlling computer. Located directly beneath each possible X–Y address would be an elongate record element, such as a magnetizable wire, filament or tape, which is withdrawn from the surrounding similar filamentary elements, the direction of withdrawal being essentially perpendicular to the X–Y plane in the Z coordinate. As the filamentary record element is withdrawn, it passes a magnetic "read" station which detects the magnetized pulses existing along the length of the filament. The Z coordinate part of the over-all address would determine at which point along the filament "read" would commence, and the reading operation would continue for one word length. After the word is read out into an auxiliary storage, the filament would be returned to its original location, and the search head would be available for the next command. In such a device, tape records may be stored in a plurality of cells. Each cell holds a purality of records, for example, of the order of 200. The records are frictionally retained in the cell in closely packed relation. Means are provided for permitting the partial withdrawal of a particular record, and simultaneously preventing the adjacent records from being drawn along with the removed records by the friction between their surfaces; improved grip tabs are also provided at the ends of the records so that they may be selectively seized and partially pulled out of the stack of records in the cell.

In another embodiment, magnetizable wires of short length are arranged in rows and a single wire is removed from any selected position in any selected row by a suction head moved into position adjacent the end of the single wire. The suction head can be provided with extendable means which moves over the end of the single wire after the head has been positioned in order to increase the effectiveness of the suction on the single wire and to isolate the effect of suction on adjacent wires. In a third embodiment of the invention, a two dimensional surface is covered by a magnetizable material on which data can be recorded or read by movement of a magnetic head over the surface.

Other objects and advantages of the invention will become apparent from a consideration of the following specification and claims, taken together with the accompanying drawings.

Figure 1:
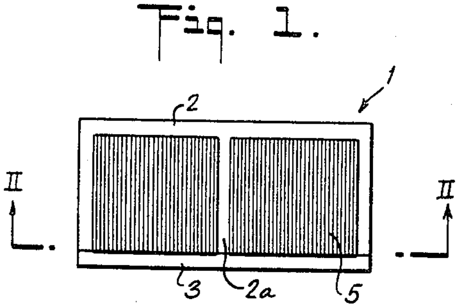
FIGURE 1 is a plan view of a single cell of tapes showing the end of the cell from which the tapes are withdrawn.
Figure 2:
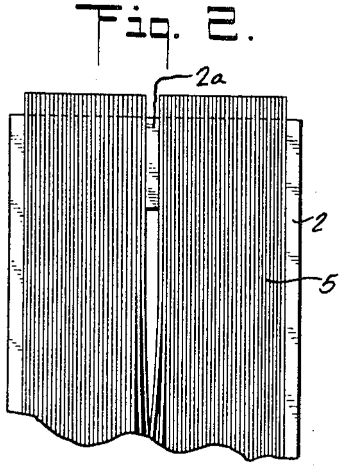
FIGURE 2 is a fragmentary, cross-sectional view taken on the line II—II of FIGURE 1, showing the construction of the tape cell.
Figures 3, 5:
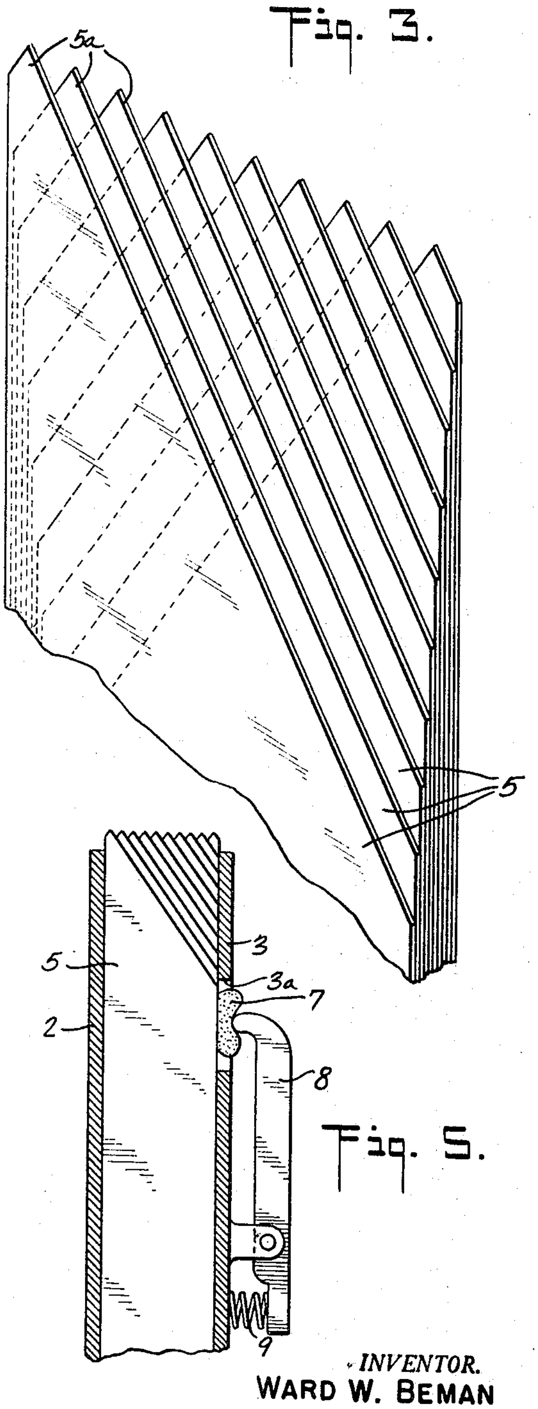
FIGURE 3 is an enlarged perspective view of a group of the tapes in the cell of FIGURES 1 to 2, showing the tab end structures by which the tapes may be seized.
FIGURE 5 is a cross-sectional view through a tape cell, showing one form of mechanism for frictionally holding the sides of the tapes.

*FIGURES 1 to 3—Tape storage cell*

The first embodiment of the invention to be described stores recordable tapes in a plurality of cells. Each cell holds a plurality of tapes, for example, of the order of 200. There is shown in FIGURES 1 and 2 a tape storage cell generally indicated by the reference numeral 1 and comprising a frame member 2 on one side of a plurality of tapes 5. On the other side of the tapes is another frame member 3. The frame member 2 is generally channel-shaped throughout most of its length, but is provided near the illustrated end of the tapes with a projecting tongue 2*a*, which divides the tapes into two groups near that end of the cell. In the structure illustrated, the tapes are selected from the upper end of the cell. While that orientation of the cell is preferred, it may be readily seen that the cell may be inverted and the tape withdrawn from the lower end, or that the cell might have any other angular orientation.

The frame member 3 is illustrated as simply a flat plate. The frame members 2 and 3 may be fastened together by any suitable means, for example, by welding.

The tongue 2*a* separates the tapes in the cell 1 into two groups, and holds the upper ends of the tapes closely packed against each other, so that their adjacent surfaces are in frictional engagement. The remainder of the lengths of the tapes are held relatively loosely by the frame members 2 and 3, as illustrated in the lower portion of FIGURE 2.

If desired, a suitable dry lubricant may be applied to the tape surfaces. Molybdenum sulfide has been found to be very satisfactory.

As best seen in FIGURE 3, the upper ends of the tapes are cut away by means of diagonal cuts at the opposite corners, so that each tape terminates in a peak or tab 5*a*. The tapes 5 are arranged in groups in the cell, each group having a convenient number of tapes and being termed hereinafter a column of tapes. FIGURE 3 is an enlarged view of the tape selecting end of one column of tapes. In any column of tapes, the respective tapes in the column have their tabs appearing at equally spaced distances across the width of the tape. This spacing of the tapes 5*a* facilitates the selection and seizing of the tapes for purposes of withdrawing them from the cell.

*FIGURE 4*

Figure 4:
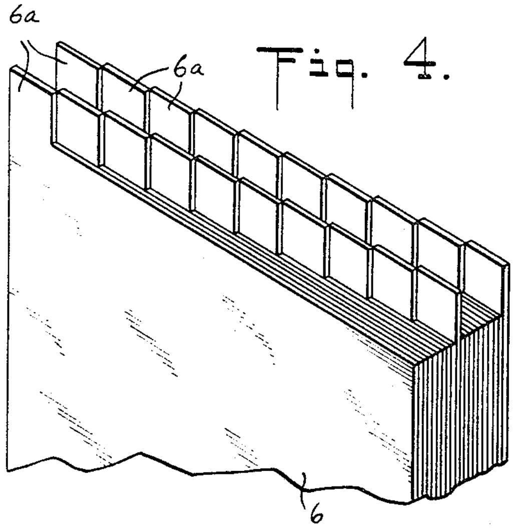
FIGURE 4 is a view similar to FIGURE 3, showing a modified form of tab end structure.

FIGURE 4 illustrates a modified form of structure for the tab ends of the tape. This figure illustrates two columns of tapes 6 having their upper ends cut away so as to form square end tabs 6*a*, equally spaced across the width of a column.

*FIGURE 5*

This figure illustrates a mechanism for frictionally holding the sides of the tape in a cell to prevent accidental removal. A portion of the frame member 3 is cut away as illustrated at 3*a* to provide an opening to receive a pad 7 held frictionally in place against the sides of the tapes 5 by means of a lever arm 8 biased toward the pad 7 by a spring 9. This arrangement prevents a tape which is not seized at its upper end from following an adjacent tape when that adjacent tape is seized.

*FIGURE 6*

This figure illustrates an alternative method of stacking tapes for preventing the tapes on either side of a selected tape from following it when the selected tape is seized and pulled. In this arrangement, each tape 5 is separated from its neighbors by a spacer 10. The ends of the spacers are of double thickness, as shown at 10*a*, so that each tape lies between two spacers. The spacers are fixed to the frame members 2 and 3 by means of rods 11 which extend through suitable apertures in the spacers and are attached to the frame member by suitable means, for example, screws 12.

Figure 8:
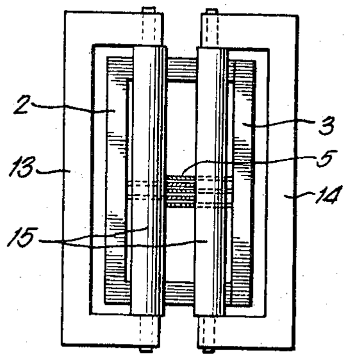
FIGURE 8 is a cross-sectional view taken on the line VIII—VIII of FIGURE 7.
Figure 6:
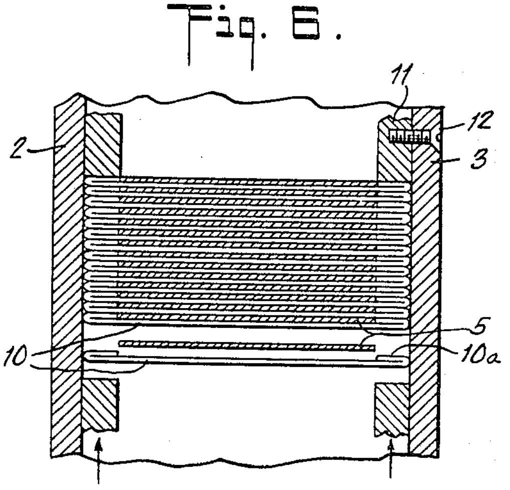
FIGURE 6 is a plan view, similar to FIGURE 1, on an enlarged scale, showing a modified form of tape storage cell, with certain of the tapes and parts removed.
Figure 7:
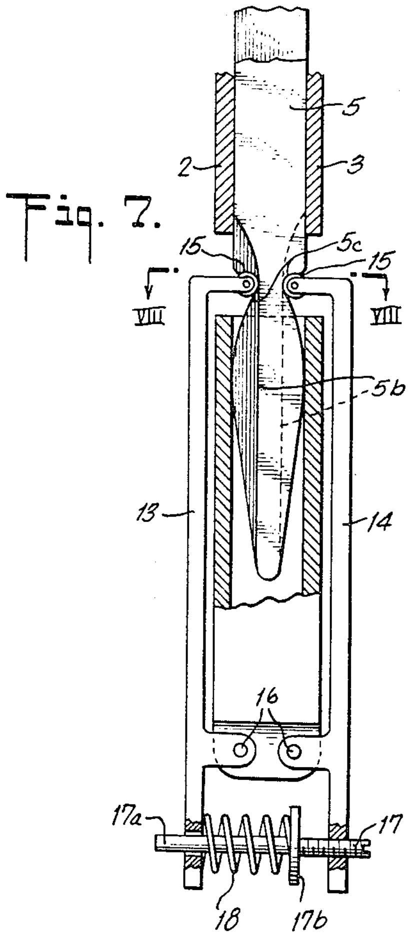
FIGURE 7 is a cross-sectional view of the opposite end of a tape cell from that shown in FIGURE 2, showing mechanism to prevent the simultaneous withdrawal of the two adjoining tapes to the one selected.

*FIGURES 7 and 8*

These figures illustrate a preferred form of machanism for holding adjacent tapes against movement with a selected tape. This particular mechanism is referred to hereinafter as the "odd-even" mechanism. In this arrangement, the lower ends of the tape are cut away with a smooth cut on one side, as illustrated at 5*b*, and a deeply notched cut on the opposite side, as illustrated at 5*c*. The smooth cuts 5*b* have the same depth throughout their length as the bottoms of the notches 5*c*. The adjacent tapes are located with their notched cuts on opposite sides.

Located on opposite sides of the frame members 2 and 3 are a pair of levers 13 and 14 having at their ends rollers 15 adapted to engage the bottoms of the notches 5*c*. The levers 13 and 14 are pivoted at 16 to the bottom of the frame member 2. A screw 17 is threaded into the lower end of the lever 14 and has a shank 17*a* projecting through the lower end of lever 13. A spring 18 is held in compression between the lower end of lever 13 and a flange 17*b* on the screw 17. Spring 18 is effective to hold the rollers 15 yieldably in engagement with the bottoms of the notches 5*c*.

When a particular tape 5 is withdrawn upwardly from the stack of tapes in the cell, then its notched edge 5*c* cams its associated roller 15 and its supporting lever outwardly. The adjacent tapes on both flat sides of the moving tape are held against vertical movement by the engagement of the opposite roller 15 with their notches 5*c*. Note that the roller 15 engages the notches 5*c* on the adjacent tapes within the deep, smooth cut on the moving tape and so is not forced outwardly by the camming action, but remains in engagement with the notches 5*c* and is effective to hold those adjacent tapes against vertical movement.

*FIGURES 9 to 18—Search head*

These figures illustrate the details of construction of the search head 19, which includes the mechanism by which a particular tape within a cell is selected, seized, withdrawn from the cell, driven past a reading or writing head, and restored to its position of storage within the cell.

Figure 10:
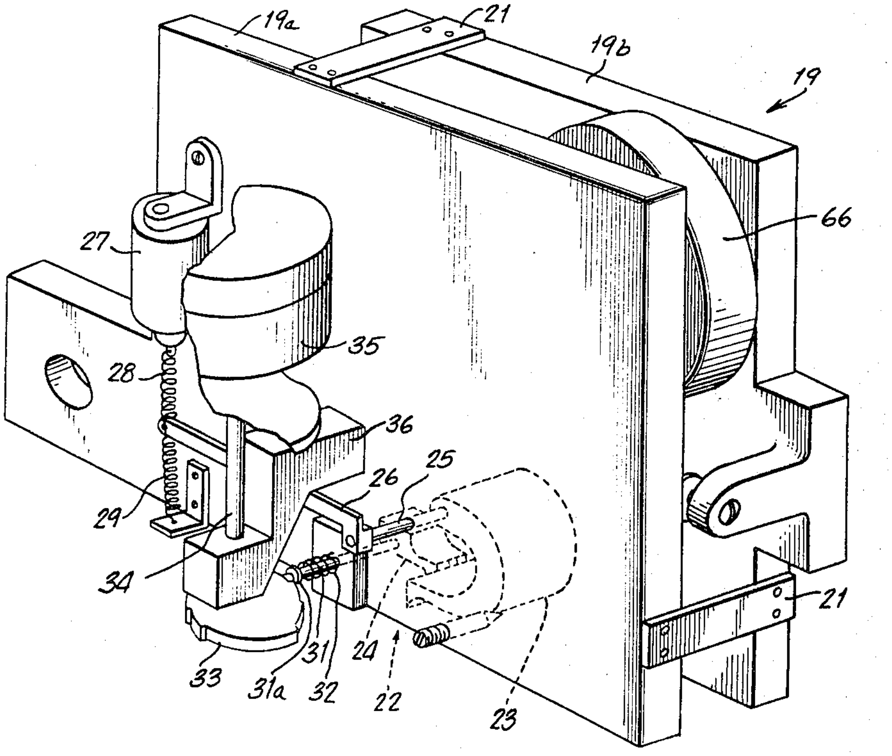
FIGURE 10 is a perspective view showing a selection plate assembled with the tape drive plate of FIGURE 9.

The principal parts of the search head are mounted on two parallel plates, hereinafter referred to as the selection plates 19*a* and the tape drive plate 19*b* (see FIGURE 10). The two plates 19*a* and 19*b* are held together in spaced relationship by any suitable means, for example, braces 21, as seen in FIGURE 10.

Figure 15:
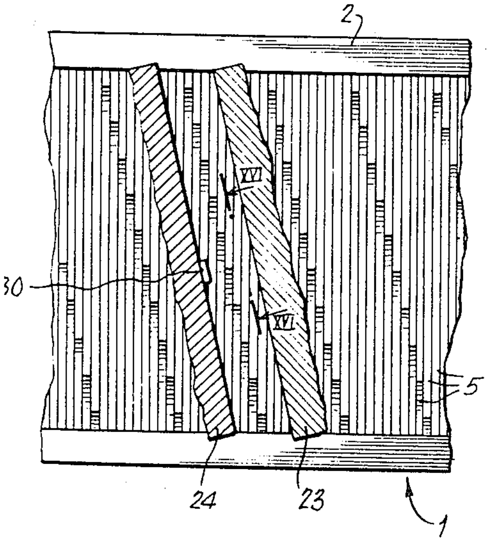
FIGURE 15 is an enlarged plan view of the top of a tape cell, showing the relationship of the pincer jaws to the tapes in the cell.
Figure 16:
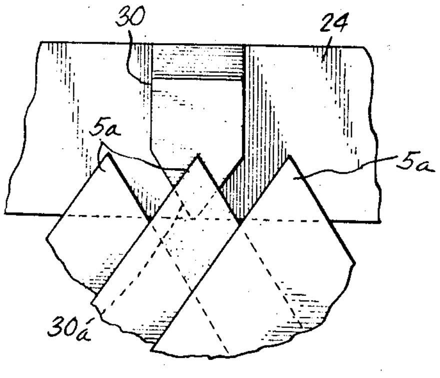
FIGURE 16 is an enlarged fragmentary elevational view taken on the line XVI—XVI of FIGURE 15, looking in the direction of the arrows.

The selection plate 19*a* supports a pair of pincers generally indicated by the reference numeral 22, and including a pincer jaw 23 and a selector jaw 24. The pincer jaw 23 and the selector jaw 24 are located between the plates 19*a* and 19*b*. The pincer jaw 23 is fixed on a rocker shaft 25, which is journaled in plate 19*a*. Outside the plate 19*a*, there is fixed on the rocker shaft 25 a lever arm 26. The other end of arm 26, as best seen in FIGURE 15, is connected by a spring 28 to an armature operated by an electromagnet 27. Another spring 29 is connected between arm 26 and a bracket fixed on plate 19*a*. Spring 29 acts in opposition to spring 28, both springs being stressed in tension. The spring 29 is considerably weaker (i.e., it has a lower spring rate) than the spring 28, so that when electromagnet 27 is energized, the arm 26 is moved upwardly against the bias of the light spring 29, thereby rotating the rock shaft 25 and moving the pincer jaw 23 into engagement with the selector jaw 24. After the jaws engage, further upward movement of the armature and the electromagnet stretches the spring 28, and loads the end of the lever 26 heavily, forcing the jaws tightly together. The jaws are thus brought into initial engagement without substantial impact, and are thereafter loaded more heavily so that they engage one another tightly.

The face of the pincer jaw 23 which engages the selector jaw 24 is a plane surface. The opposing face of selector jaw 24 has a raised nub 30 (see FIG. 16). The lower end of the nub 30 is pointed, as shown at 30*a*. The selector jaw 24 is fixed on a rod 31 which is mounted in the selection plate 19*a* for sliding movement with respect thereto. This sliding movement is controlled as required to bring the nub 30 selectively into alignment with any one of the pointed tips 5*a* of the tapes 5 stored in the cell above which the search head 19 is located.

Outside the plate 19*a*, the rod 31 is provided with a flange 31*a*. A spring 32 is held in compression between the flange 31*a* and the plate 19*a* and biases the rod 31*a* and jaw 24 for movement toward plate 19*a*. The outer end of rod 31 engages a stepped cam 33 fixed on a shaft 34 which is rotated by means of a suitable stepping mechanism 35. The stepping mechanism 35 is shown in external elevation in FIGURES 10 and 14. Any suitable internal structure of the stepping mechanism may be used, one particular conventional form of stepping mechanism being illustrated diagrammatically in FIGURE 20. The shaft 34 is journaled in a block 36 fixed on the outside of plate 19*a* and projecting therefrom. It will be readily understood, particularly with reference to FIGURES 15 and 16, that when the search head is in any fixed position above a cell 1, a particular column of the tapes in the cell is located between the pincer jaws 23 and 24. By shifting the pincer jaw 24 laterally of the cell, the nub 30 may be brought into alignment with any one of the tapes in the particular column. The cam 33 performs the function of shifting the selector jaw 24 and the energization of the selecting mechanism 35 determines the alignment of the nub 30 with a particular tape end. Thereafter, the pincer jaw 23 is moved toward the selector jaw 24, as described in detail below, so that the end of the selected tape is seized between the plane surface of the jaw 23 and the nub 30.

Figures 17, 22:
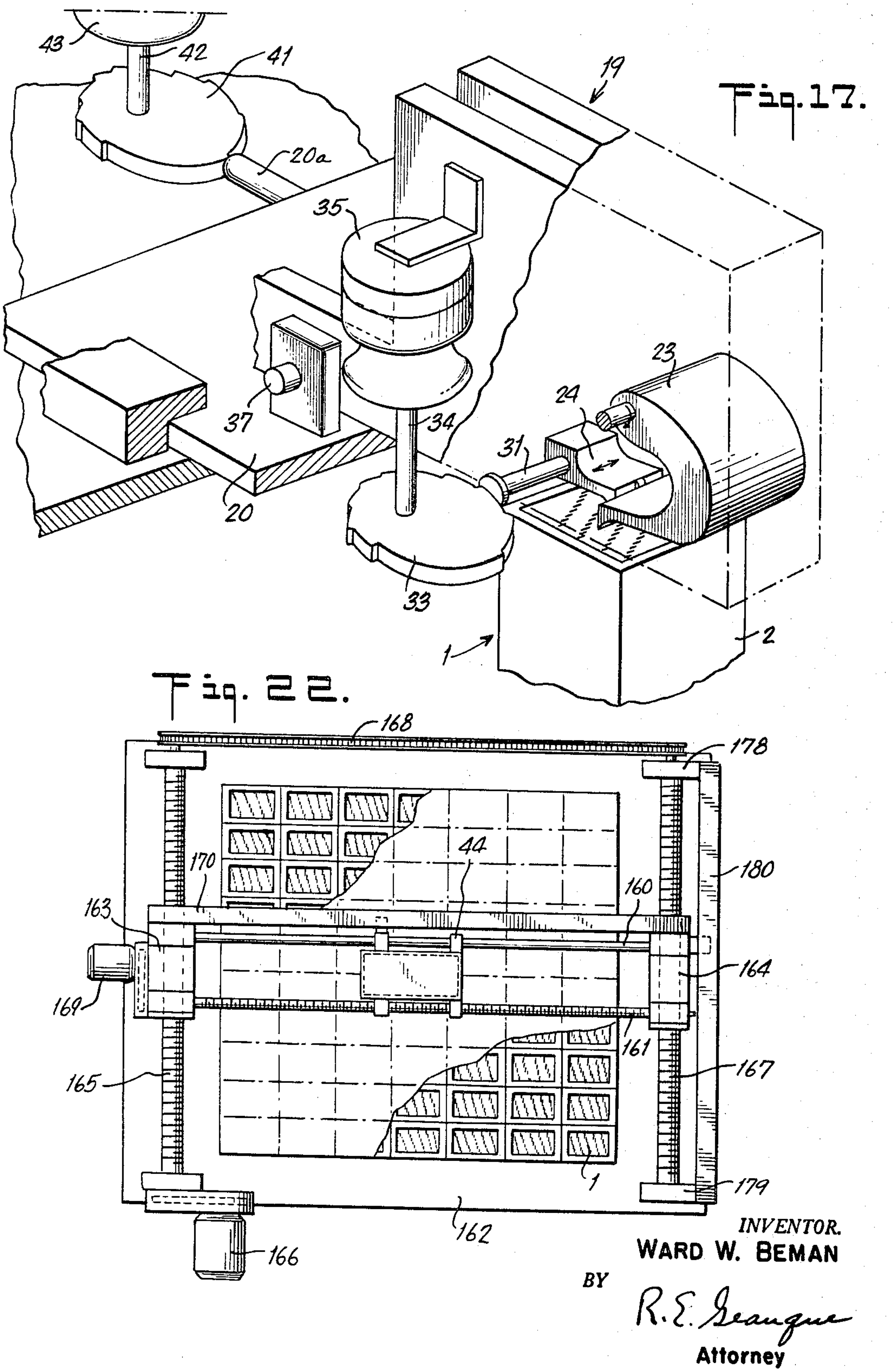
FIGURE 17 is a fragmentary perspective view showing the search head including the tape gripping and driving means, and means for positioning the search head with respect to a storage cell.
FIGURE 22 is a plan view of a complete storage unit including a plurality of tape cells, a carriage supporting a search head, and coarse positioning mechanism for positioning the search head adjacent any cell among the plurality of cells in the complete unit.
Figure 23:
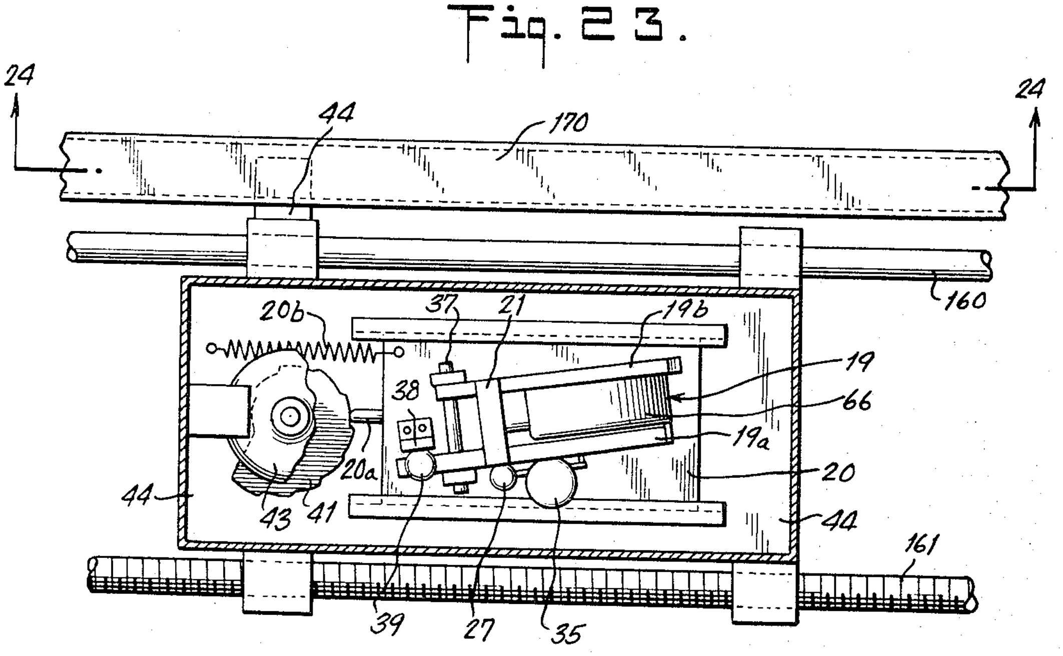
FIGURE 23 is a fragmentary plan view similar to FIGURE 22, but on an enlarged scale, and with the search head cover removed, and showing details of the carriage and search head construction.

The search head 19, including the plates 19*a* and 19*b*, is journaled on a shaft 37 which is fixed in a carriage 20, (see FIG. 23) on which is mounted a bracket 38. Fixed on the bracket 38 is an electromagnet 39, whose armature is connected through a link 40 to the end of an arm projecting from the plate 19. The armature and link 40 are biased by a suitable spring so that when the electromagnet 39 is deenergized, the entire search head assumes an upwardly tilted position, as shown for example in FIGURE 18A. When electromagnet 39 is energized, the link 40 is drawn upwardly and the search head is lowered to the horizontal position shown in FIGURES 14 and 18B. Note that when the search head is in its normal position, the pincer jaws 23 and 24 are lifted upwardly and clear the tops of all the tapes 5, so that the search head may then be moved endwise of the cell to select a particular column thereof. The column selecting mechanism is illustrated in FIGURES 17 and 23, and includes a stepped cam 41 shown as acting on a follower 20*a* attached to the carriage 20 and effective to position the carriage longitudinally of the cell, i.e. from left to right or right to left as viewed in FIGURES 14 and 23. A spring 20*b* biases the carriage 20 so as to hold follower 20*a* in engagement with cam 41. The stepped cam 41 is mounted on a shaft 42 and is positioned by a stepping mechanism 43, which may be similar in structure to the stepping mechanism 35. The stepping mechanism 43 and the stepped cam 41 move the entire search head carriage 20, and are mounted on a gross positioning carriage 44, shown and described in greater detail below in connection with FIGURE 23.

A pair of tape drive rollers 45 and 46 (see FIGURE 9) are respectively fixed on shafts 47 and 48 journaled in the plate 19*b* and driven by a reversible drive mechanism mounted on the back of plate 19*b*. The shafts 47 and 48 carry, on the back of plate 19*b*, a pair of rollers 49 and 50, respectively, which continuously engage each other, so that the shafts 47 and 48 always turn in opposite directions. One or the other of the rollers 49 and 50 is driven through a shiftable idler roller 51 by a flywheel 52, which is rotated by a motor 53. Motor 53 also drives, through a clutch 54, a timing cam 55 which actuates a cam follower 56 connected to a switch 57, which may be a micro-switch. There is also provided a cam detent solenoid 58, which operates a detent 59 biased by a spring 60 to engage a notch 55*a* in the periphery of the cam 55. The cam 55 cannot rotate until the solenoid 58 is energized to release the detent 59 from the notch 55*a*. Detent 59 fixes the starting position of cam 55, so that its operation is accurately timed.

Figure 9:
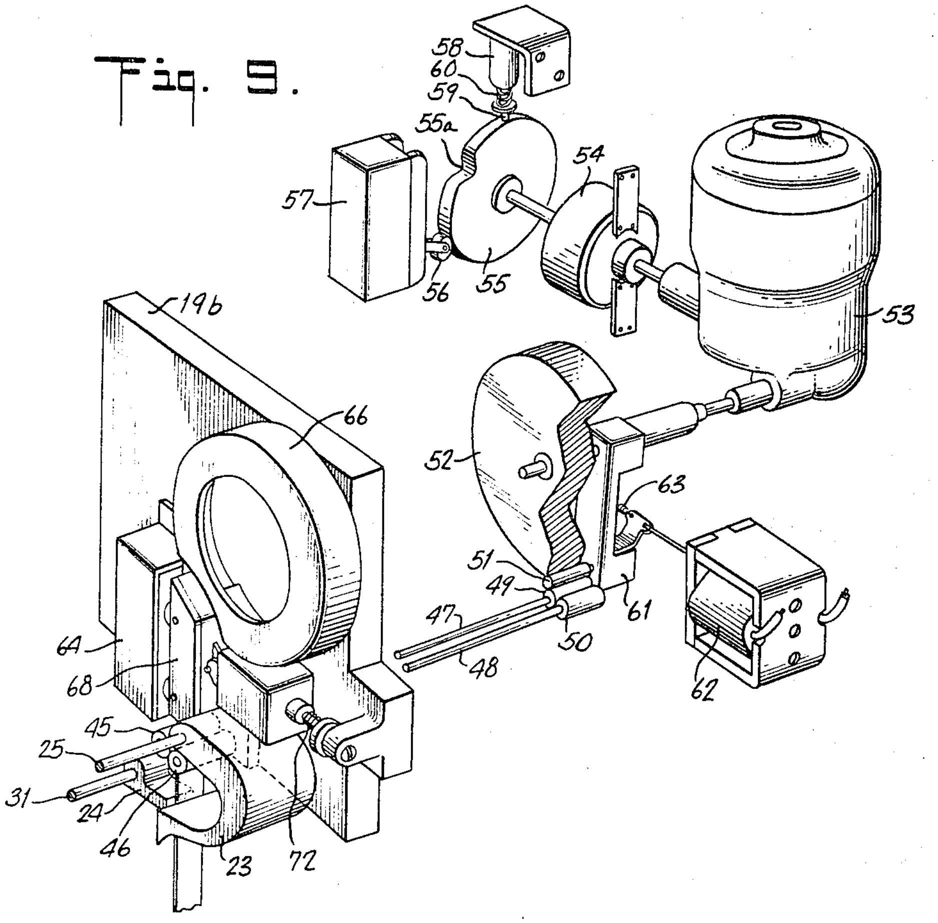
FIGURE 9 is an exploded perspective view, showing a tape drive plate and the principal parts of the mechanism for seizing and withdrawing a tape from the cell of FIGURE 1.
Figure 9A:
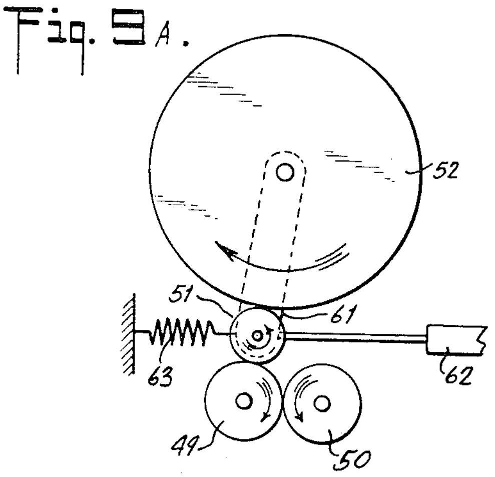
FIGURES 9A and 9B are diagrammatic illustrations of the operation of a tape reversing mechanism included in FIGURE 9.
Figure 9B:
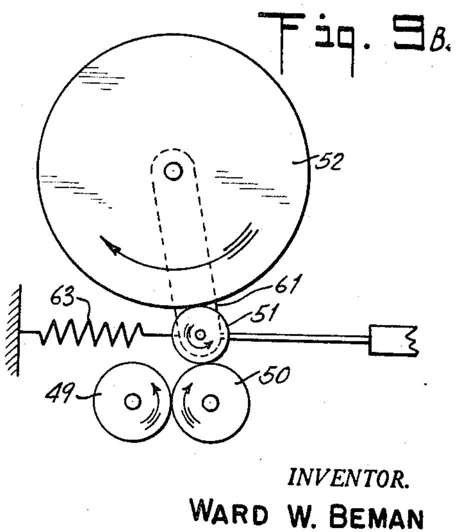

The direction of rotating of the shafts 47 and 48 is determined by a reversing mechanism best shown diagrammatically in FIGURES 9A and 9B. It may there be seen that the idler roller 51 is journaled on the end of an arm 61, whose opposite end is rotatable about the axis of flywheel 52. The outer end of arm 61 is shiftable by means of an electromagnet 62 between the position shown in FIGURE 9A, wherein the idler roller 51 lies between the flywheel 52 and the roller 49, and the position of FIGURE 9B in which the idler roller 51 lies between flywheel 52 and drive roller 50. A spring 63 biases the arm 61 to the position of FIGURE 9A. When the parts are in that position, the tape drive rollers 49 and 50 rotate in a direction to drive downwardly a tape passing between them. When the solenoid 62 is energized, the parts move to the position of FIGURE 9B, whereupon the tape drive rollers 49 and 50 become effective to drive upwardly a tape passing between them.

Above the tape drive rollers 45 and 46, the plate 19*b* carries a read or write head 64, and pressure pad means 65 (see FIG. 11) for holding a moving tape in cooperative engagement with the read or write head 64. Above the read or write head 64 is located a magazine 66, for receiving and coiling a tape as it moves upwardly past the read head 64.

Throughout this specification, the head 64 is spoken of at times as a read head. It is well understood by those skilled in the art that the head 64 may alternatively function as a write head on any given movement of the tape past it. In other words, it may translate data either to or from the tape. It is spoken of as a read head in the present description only for the purpose of simplifying the specification.

Figure 13:
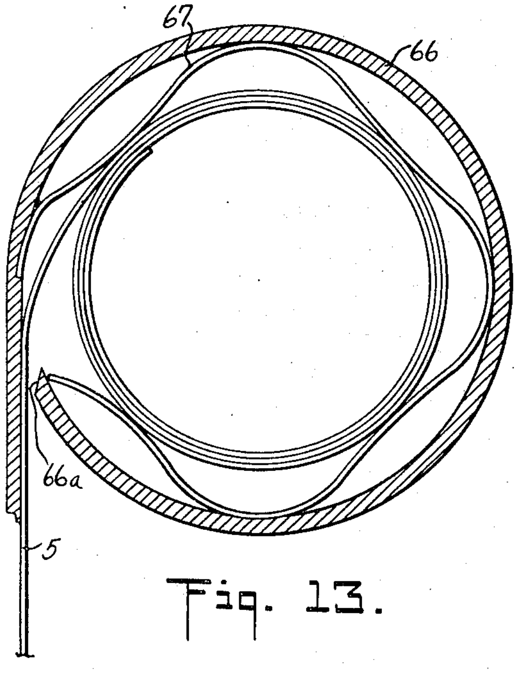
FIGURE 13 is a cross-sectional view through a tape magazine forming a part of the tape reading mechanism of FIGURES 9 and 10.

The magazine 66, as best seen in FIGURE 13, comprises a cylinder having a lateral opening 66*a* for receiving a tape 5. A leaf spring 67 preformed with a sinous contour is fixed at one end to the inner wall of the cylinder, so that it provides a yieldable cushion against which the tape 5 is driven as it moves upwardly into the magazine. By virtue of the spring 67, the effective inner diameter of the magazine casing expands as the succeeding turns of tape are driven upwardly into the magazine 66, so that the coil of tape rotates, sliding over the high points of the flat spring 67, and there is no frictional slipping between the turns of tape as it piles up in the magazine. The amplitude of the sinous contour of the spring 67 is made sufficient so there is ample room within the magazine 66 to receive an entire tape length 5.

As is well known in the art, each tape 5 may carry several parallel channels which are read or written simultaneously. Each channel requires a separate reading or writing coil. In the head 64 there may be a row of upper reading or writing units 64*a*, which engage alternate channels on the tape, and a row of lower reading or writing units 64*b*, which engage the other channels on the tape.

Figure 11:
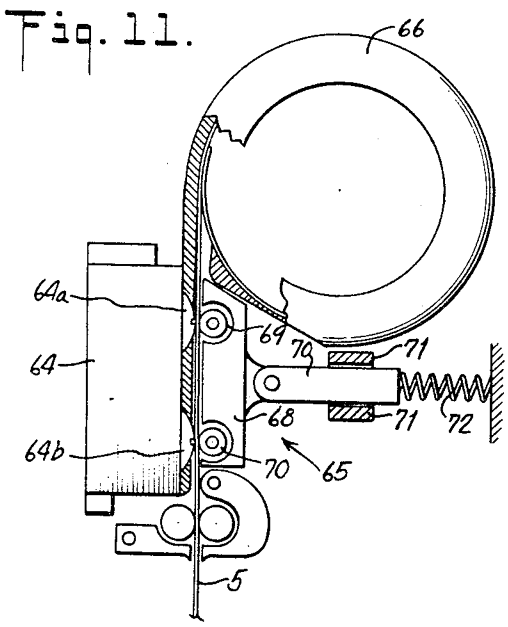
FIGURE 11 is an elevational view, with certain parts broken away and others shown in section, illustrating the tape driving and reading mechanism on the tape drive plate of FIGURE 9.

A preferred form of pressure pad mechanism for holding the tape in engagement with the read head 64 is illustrated in FIGURE 11. This mechanism includes a frame 68 on which are journaled a pair of rollers 69 and 70, respectively adapted to engage the side of the tape opposite the upper and lower reading units 64*a* and 64*b*. The frame 68 is pivoted on a rod 70 slidably mounted between guides 71, and biased by a spring 72 to hold the rollers 69 and 70 in contact with the tape.

It has been found that the pressure pad 65 cooperates effectively with the magazine 66 and with the tape cell 1 to maintain a tape being read in accurate alignment with the read head 64, and that this alignment is maintained during both upward and downward movements of the tape, so that a tape may be read during an upward movement and written during the following downward movement, or vice versa.

Figure 12:
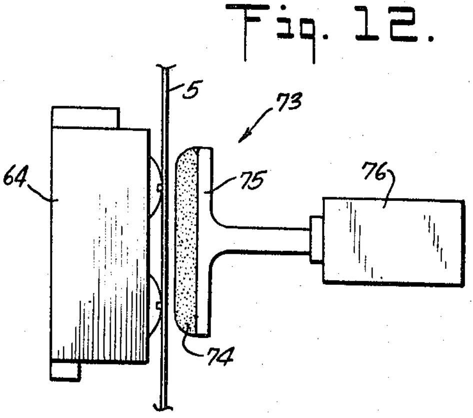
FIGURE 12 is a fragmentary view similar to a portion of FIGURE 11, showing a modified form of tape reading head and guide means.
Figure 14:
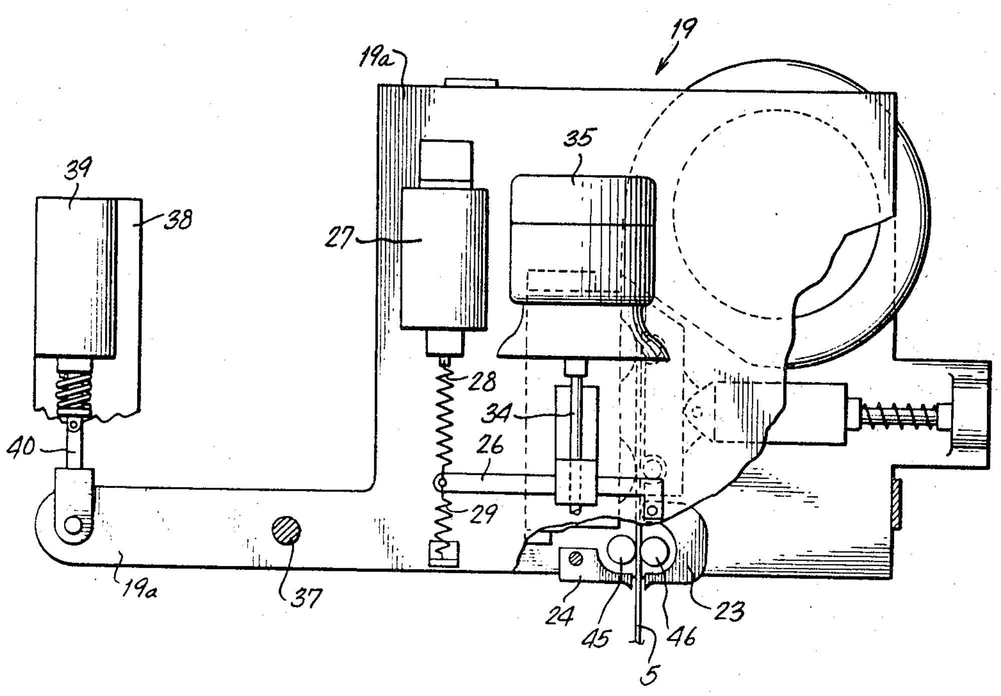
FIGURE 14 is an elevational view of the tape seizing and driving mechanism of FIGURES 9 and 10, with certain parts broken away for purpose of clarification.

An alternate pressure pad arrangement is shown in FIGURE 12. In this arrangement, the pressure pad is generally indicated at 73, and includes a pad 74 of sponge rubber or similar resilient material mounted on a frame 75 which is positioned by an electromagnet 76. A spring (not shown) biases the frame 75 to a position wherein the pad 74 is free of the tape 5. When it is desired to read or write the tape, the electromagnet 76 is energized, and holds the pad 74 firmly against the opposite side of tape 5, thereby maintaining it in smooth operative contact with the read head 64. If desired, the face of the pad 74 may be provided with a flexible metal coating.

*Operation of search head—FIGURES 18A to 18E*

Figure 18A:
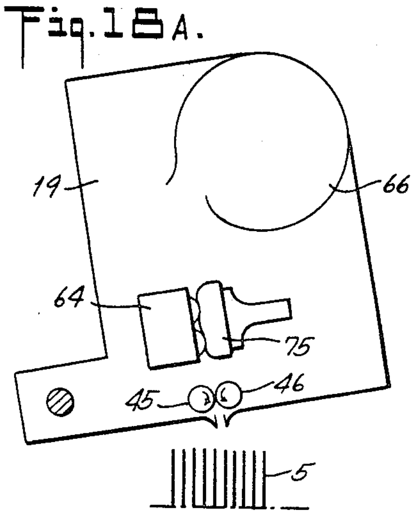
FIGURES 18A, 18B, 18C, 18D and 18E, illustrate schematically five sequential positions of the tape seizing and driving mechanism of FIGURES 9 to 11.

A tape is selected by moving the search head to bring it into alignment with a particular column of tapes and by moving the selector jaw 24, to bring the nub 30 into alignment with a particular tape. During the tape selection, the search head is tilted as shown in FIGURE 18A. These two positioning operations are accomplished by sequential energization of the stepping mechanisms 35 and 43, as described in detail below. After the tape selection is completed, the search head is then moved through a tape seizing and reading cycle illustrated in FIGURES 18A to 18E.

Figure 18B:
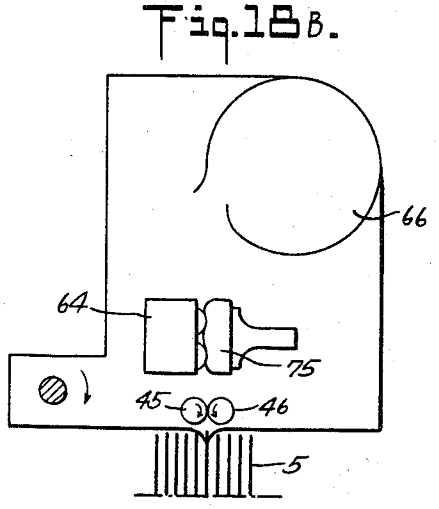
Figure 18C:
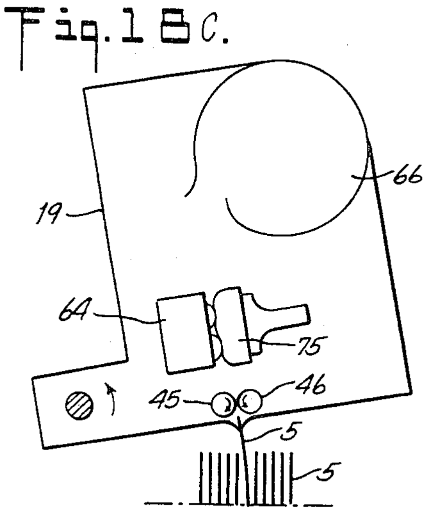
Figure 18D:
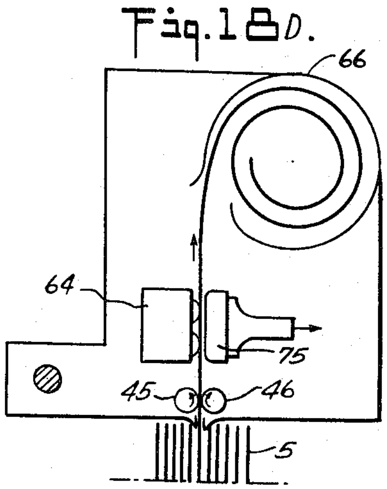
Figure 18E:
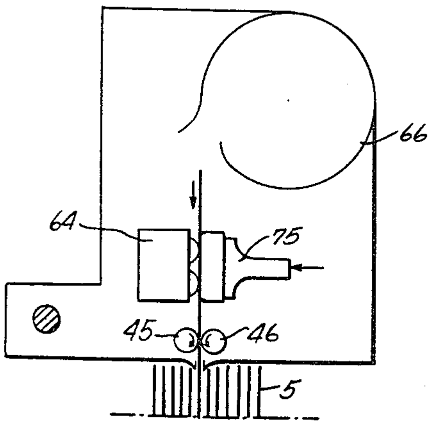

First the electromagnet 39 is energized to tilt the search head to the horizontal position shown in FIGURE 18B, after which the electromagnet 27 is energized to move pincer jaw 24 toward engagement with selector jaw 25, thereby seizing the particular tape 5 with which the nub 30 on the selector jaw 24 has been aligned. The electromagnet 39 is then deenergized, and the search head tilts back to the position of FIGURE 18C, pulling the seized tape upwardly. After the position in FIGURE 18C is reached, the electromagnet 27 is deenergized, opening the pincer jaws and leaving the end of the selected tape 5 projecting upwardly above the other tapes. Electromagnet 39 is again energized, tilting the search head again to the horizontal position as shown in FIGURE 18D. This brings the upwardly projecting end of the selected tape between the tape drive rollers 45 and 46, which are at this time turning in a direction to drive the tape upwardly. The tape is engaged by the tape drive rollers and is driven upwardly past the read head 64 and is received in the tape magazine 66. Just before the lower end of the tape passes out from between the adjacent tapes in cell 1, the timing cam 55 (see FIGURE 9) operates the switch 57 which is effective to deenergize the electromagnet 62, so that spring 63 (see FIGURE 9A) swings the arm 61 to the left, reversing the tape drive rollers 45 and 46. The tape is then driven downwardly toward its storage position. As the upper end of the tape passes out from between the tape drive rollers, the spring loaded lever 14 (see FIGURE 7) is riding along the inward slope of the curve formed on the lower end of the tape, and is effective to continue the downward movement of the tape until the roller 15 rests in the bottom of the notch 5*c*. The tape is thereby restored to its original position.

The electromagnet 39 is again deenergized under the control of cam switch 57 whereupon the search head tilts back to the position of FIGURE 13A, ready for repositioning to select a new tape for reading.

Figure 19:
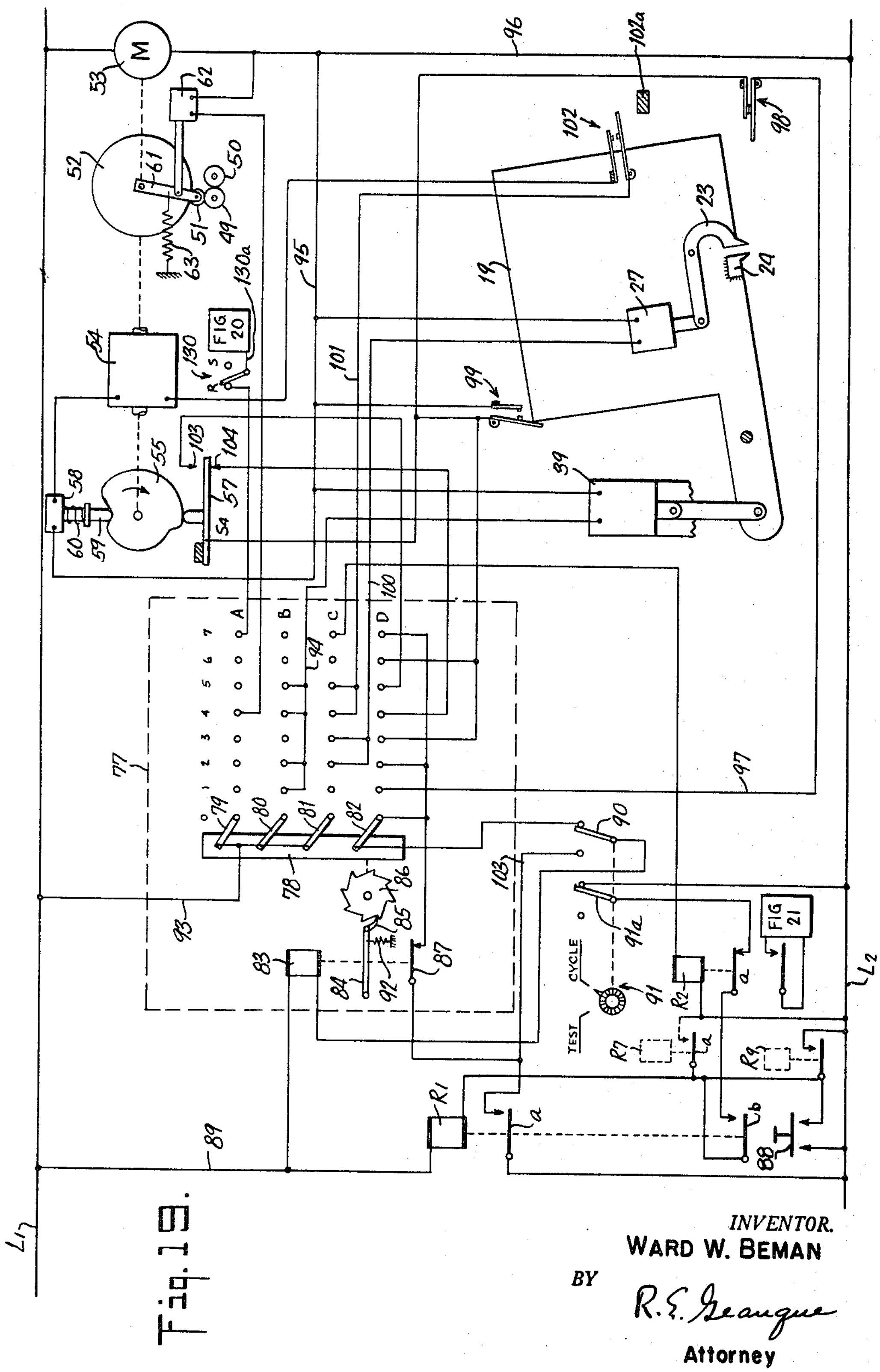
FIGURE 19 is an electrical wiring diagram showing a control system for the tape gripping and driving mechanism.
Figure 20:
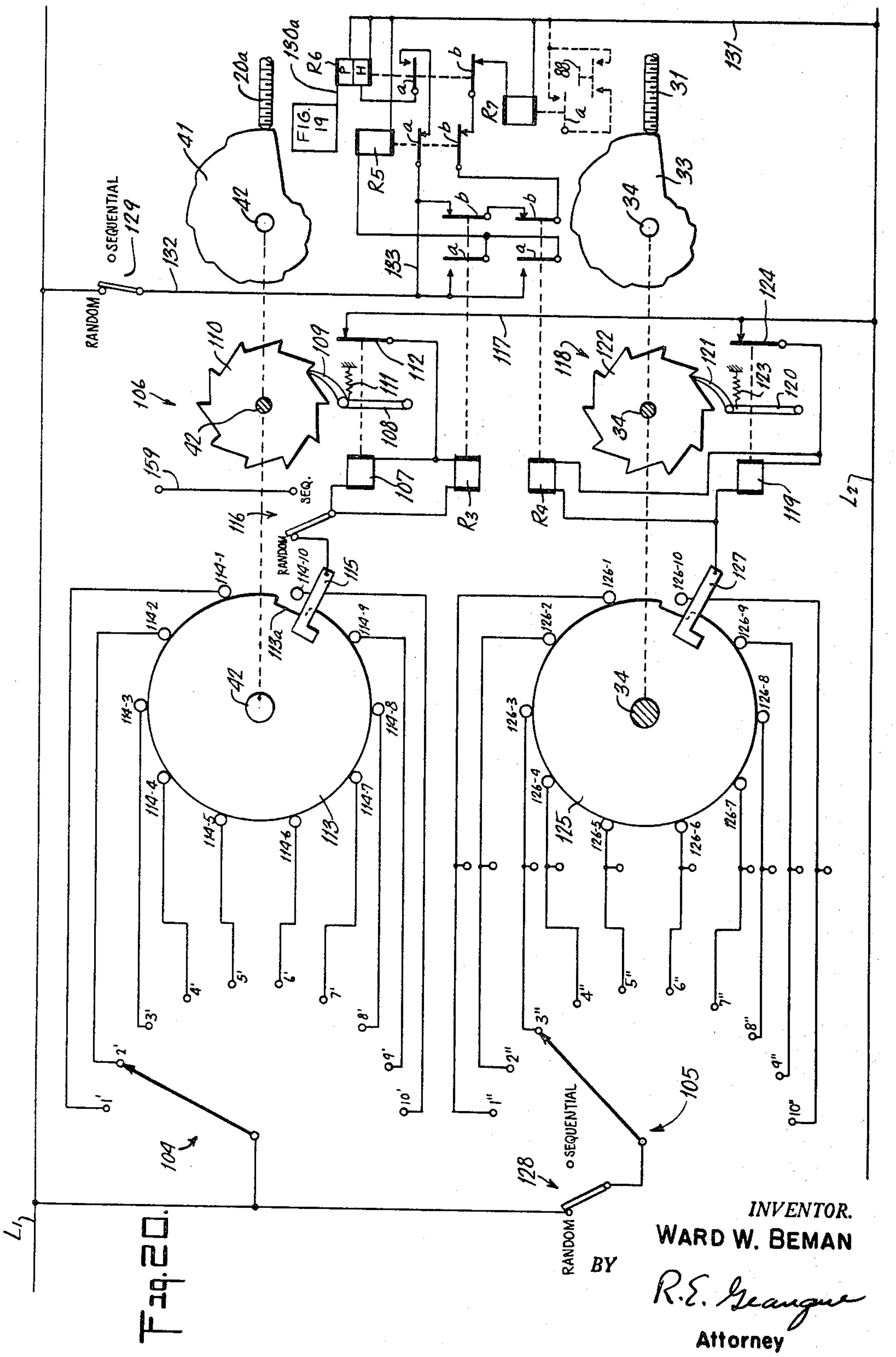
FIGURE 20 is a wiring diagram of mechanism for manually selecting a particular tape to be gripped by the tape gripping mechanism, together with apparatus for automatically selecting the tapes in a predetermined sequence.
Figure 21:
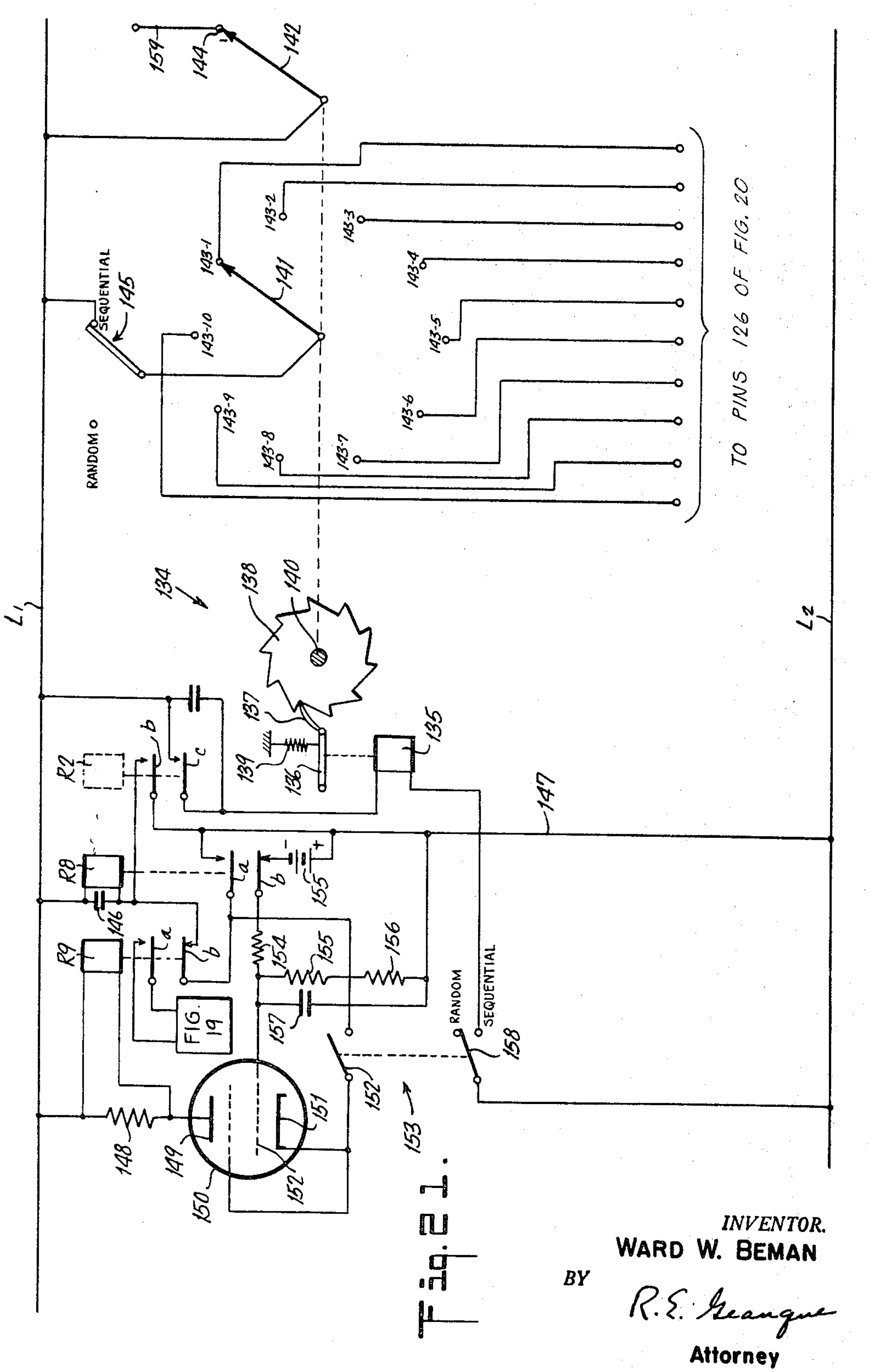
FIGURE 21 is a wiring diagram of additional mechanism for automatically selecting the tapes in a predetermined sequence.

*FIGURES 19 to 21 Electrical circuits*

These figures illustrate circuits which are used to perform the selection of a particular tape, and the sequence of operations described above in connection with FIGURES 18A to 18F. More specifically, these operations include the positioning of the search head carriage 20 to select a particular column of tapes, the positioning of the selector jaw 24 to select a particular tape in the column, and the subsequent operations of seizing the selected tape, driving it past a read head and restoring it to its storage position.

*FIGURE 19—Tape seizing, reading and restoring*

The sequence of operations illustrated in FIGURES 18A to 18E will first be described with reference to FIGURE 19, i.e., the tape seizing and reading operations. Thereafter, the coordination of the tape seizing and reading operations with the tape selecting operations will be described in connection with FIGURES 20 and 21. Referring to FIGURE 19, the sequence of operation in the seizing and reading cycle is controlled by a stepping switch generally indicated by the reference numeral 77. The stepping switch 77 includes an arm 78, carrying four brushes 79, 80, 81 and 82. The four brushes cooperate respectively with four rows of stationary contacts identified as the rows A, B, C and D. There are eight contacts in each row. The four brushes engage the four contacts in any one column at the same time. The eight columns are respectively designated as the 0, 1, 2, 3, 4, 5, 6 and 7 columns. Although the contacts are shown as arranged in rows and columns, it should be appreciated that in the actual structure, the rows will be circular rows of contacts, and the arm 78 will move in a circular path. The arm 78 is operated by an electromagnet 83 having an armature 84 carrying a pawl 85 which drives a ratchet wheel 86, the ratchet wheel being connected to the arm 78, so that both rotate concurrently. Also movable concurrently with armature 84 is a contact 87 which moves out of engagement with a stationary contact when the electromagnet 83 is energized.

The arm 78 is shown in its zero position which is the position it holds when the search head is being moved from one tape seizing location to another. After the search head and the selector jaw 24 have been moved to a predetermined tape selecting position, a seizing and reading cycle is initiated. This seizing and reading cycle may be initiated automatically by one of the mechanisms to be described below, or it may be initiated manually by depressing a push button 88.

Closure of the push button switch 88 completes an energizing cycle for a relay R1 which may be traced from a power supply line L1 through a wire 89, the winding of relay R1, and thence through push button 88 to an opposite power supply line L2.

Energization of relay R1 closes an energizing circuit for electromagnet 83, hereinafter referred to as the normal circuit for that electromagnet. This circuit may be traced from line L1 through wire 89, the winding of electromagnet 83, contact 90 of a switch 91 in its right-hand position, the brush 82 of the stepping switch 77, contact 0 in row D of the stepping switch, contact 87 of the stepping switch and thence through the front contact *a* of relay R1 to the supply line L2.

Energization of relay R1 also completes a holding circuit for itself which may be traced from line L1, through wire 89, the winding of relay R1, front contact *b* of relay R1, back contact *a* of a relay R2, and thence through contact 91*a* of switch 91 in its right-hand position to line L2.

When the electromagnet 83 is energized, it attracts the armature 84, opening the contact 87 and moving the pawl 85 one tooth along the ratchet 86. Opening the contact 87 deenergizes the electromagnet whereupon spring 92 becomes effective to restore the armature to its normal position and advance the ratchet one tooth, thereby shifting the arm 78 to carry the brushes 79, 80, 81 and 82 into engagement with contacts of the column 1.

When the brushes of steeper switch 77 engages the contacts of column 1, the brush 80 completes a circuit for energizing electromagnet 39 and thereby lowering the search head 19 to to its horizontal position. This circuit may be traced from line L1 through wire 93, brush 80, wire 94, electromagnet 39 and wires 95 and 96 to supply line L2.

At the same position (column 1 contacts closed), the stepper switch 77, the contact in row D sets up an energizing circuit for the electromagnet 83, which circuit is closed later. This circuit may be traced from supply line L1 through wire 89, electromagnet 83, contact 90 in its right-hand position, brush 82, wire 97, a switch 98 (now closed), a switch 99 (now open) and wires 95 and 96 to supply line L2. The switch 98 is self-biased to closed position and is opened by the movement of the search head 19 to its horizontal position. Switch 99 is self-biased to closed position and is opened by the movement of search head 19 to its normal tilted position. It may be seen that the circuit just traced is closed at the start of the downward movement of the search head 19 toward its horizontal position by the electromagnet 39, and that when the horizontal position is reached, the circuit is opened at switch 98. When the circuit is completed, the electromagnet 83 advances the pawl 85 one notch on the ratchet 86 and when the circuit is broken again spring 92 advances the ratchet 86 one notch moving brushes 79, 80, 81 and 82 over to the column 2 contacts.

The B contact in column 2 maintains the energizing circuit for electromagnet 39, so that the search head 19 stays down. The C contact in column 2 completes an energizing circuit for electromagnet 27. This circuit may be traced from supply line L1 through wire 93, brush 81, wire 100, electromagnet 27 and wires 95 and 96 to supply line L2. Energization of electromagnet 27, as described above, causes the pincer jaw 23 to move toward the selector jaw 24 thereby seizing the selected tape. The D contact in column 2 completes the normal circuit for electromagnet 83, so that immediately after the electromagnet 27 is energized, the stepping switch operates and arm 78 is moved along to bring the brushes into engagement with the column 3 contacts.

The energizing circuit for electromagnet 39 is broken at row B in column 3, so that the search head 19 swings upwardly carrying the selected tape upward from the cell 1 in its clamped pincers 23 and 24. The contact in row C maintains the energization of the biasing electromagnet 27, holding the pincers clamped. In row D, the contact in column 3 completes an energizing circuit for electromagnet 83 through switch 99, so that when the search head 19 reaches its upper position, this circuit is opened and the stepper switch moves along to the column 4 contacts.

The A contact in column 4 completes an obvious energizing circuit for electromagnet 62, thereby driving the tape driving rollers 49 and 50 in a direction to drive the selected tape upwardly. The B contact in column 4 energizes the electromagnet 39 again, driving the search head 19 down and moving the upwardly rotating tape driving rollers 45 and 46 downwardly until they grip the projecting upper end of the selected tape. The rollers seize the tape and drive it upwardly. In row C of column 4, a circuit is completed for energizing the reversing clutch 54 and the detent electromagnet 58 in series. This circuit may be traced from line L1 through wire 93, brush 81, wire 101, switch 102, clutch 54, electromagnet 58 and wires 95 and 96 to supply line L2. Switch 102 is biased to open position. It is shown as being mounted on search head 19 and closed by engagement with a stop **102*a* when the search head 19 reaches a position where the end of the tape enters between the tape drive rollers 45 and 46. The cam 55 then starts to rotate in a clockwise direction. The D contact of column 4 completes an energizing circuit for the electromagnet 83 which extends through back contact 104 of cam operated switch 57 and thence through switch 99 and wires 95 and 96 to supply line L2. The various parts remain in these positions until cam 55 is rotated substantially one-half revolution. The gear train (not shown) between motor 53 and cam 55 is coordinated with the length of the tape, so that when the lower end of the tape aproaches the top of the cell, but before it has left the cell, the cam 55 completes its half revolution, thereby operating switch 57 from engagement with contact 103. This breaks the circuit for electromagnet 83, whereupon spring 93 is effective, to advance the pawl 85 another notch, moving the brushes to the column 5 contacts of the stepping switch 77**.

At the A contact in column 5, the energizing circuit for reversing electromagnet 62 is broken, and the tape driving rollers 45 and 46 now reverse, driving the tape downwardly. At the B contact, the energizing circuit for the electromagnet 39 is maintained. At the C contact, the energizing circuit for clutch 54 and electromagnet 58 are maintained. At the D contact, an energizing circuit for electromagnet 83 is completed through contact 103, switch finger 57, switch 99 and wires 95 and 96. The parts remain in this position until the tape is restored to its normal position of storage. Note that the downward driving position of the cam 55 is slightly longer than the upward driving portion to insure that the tape reaches its final storage position. When the cam 55 completes its revolution, switch finger 57 is moved from engagement with contact 103 to engagement with contact 104, thereby breaking the energizing circuit for electromagnet 83 so that the brushes of the stepping switch advance to column 6.

At the B contact of column 6, the previously established circuit for electromagnet 39 is broken, and search head 19 starts swinging back towards its upper position. In line C, the previously established circuit for the clutch 54 and electromagnet 58 is opened, de-energizing those elements and latching the cam at its predetermined starting position by engagement of the detent 59 with the notch on the cam surface. In line D, the energizing circuit for electromagnet 83 is completed through switch 99, so that when the search head 19 reaches its upper position, switch 99 opens, de-energizing electromagnet 83 and allowing the stepper switch to move to its column 7 position.

In column 7, contact A completes a circuit to be described below in connection with FIGURE 20, and of no particular significance here. No action takes place at contact B. Contact C completes an energizing circuit for relay R2, which may be traced from supply line L1 through wire 93, brush 81, contact C, column 7, and thence through the winding of relay R2 to supply line L2. Energization of relay R2 opens its back contact *a*, opening the holding circuit for relay R1, thereby de-energizing the relay R1. Contact D completes the energizing circuit for electromagnet 83 over its back contact 87, so that the stepper switch immediately steps onto its zero position, and the cycle of seizing and reading is completed.

Switch 91 is movable between the "cycle" position in which it is shown and a "test" position, in which energization of electromagnet 83 is independent of the contact 87 and of the position of stepper switch 77. The circuit for energizing electromagnet 83 may be traced from supply line L1 through wire 89, electromagnet 83, switch contact 90 in its left-hand position, wire 103 and thence through contact A of relay R1. When switch 91 is in its test position, the holding circuit for relay R1 is broken at contact **91*a*. The stepping switch 77 may then be set manually in any desired position by repeated operation of the push button 88**.

*FIGURE 20—Random tape selection*

This figure illustrates circuits and control apparatus by which the storage head may be set to select a particular tape within a cell, that tape being chosen at random and without regard to the previous position of the storage head with respect to the cell. This apparatus may be modified by the addition of the circuits and control instrumentalities illustrated below in connection with FIGURE 21, to select the tapes in sequential order, rather than at random.

There are shown in FIGURE 20, two selector switches 104 and 105. Switch 104 is a column selector switch and has a number of positions corresponding to the number of columns in a cell. In the specific example illustrated, it is shown as a ten position switch, the ten positions being numbered 1′ to 10′, corresponding to ten columns in a cell. The selector switch 104 controls a stepper switch generally indicated at 106. The stepper switch 106 is operated by an electromagnet 107 which operates an armature 108, carrying a pawl 109 which cooperates with a ratchet 110. A spring 111 biases the armature 108 against the action of electromagnet 107. A back contact 112 is opened concurrently with the attraction of armature 108 by the electromagnet 107.

The ratchet 110 is mounted on a shaft 42 which also carries a contact disk 113 which turns in conductive engagement with a series of contact pins numbered respectively 114–1 to 114–10, and respectively connected to the contacts 1′ to 10′ of the selector switch 104. The disk 113 is provided with a notch **113*a* in its periphery substantially wider than any one of the contacting pins 114. The shaft 42 also carries the stepped cam 41 (see FIGURE 17) which cooperates with the follower 20*a* to position the search head carriage 20**.

When selector switch 104 is moved to any particular position, such as the position 2′ illustrated, then a circuit is completed for energizing the electromagnet 107, which may be traced from supply line L1 through switch 104 and its contact 2′, pin 114–2, disk 113 and thence through a brush 115 which rides on disk 113, a switch 116, electromagnet 107, contact 112 and wire 117 to supply line L2. This energization of electromagnet 107 advances the pawl 109 one notch on the periphery of the ratchet 110, and the energizing circuit is opened at switch 112, allowing spring 111 to retract the pawl, advancing the ratchet 110 one tooth and again closing the energizing circuit for electromagnet 107 at switch 112. The electromagnet 107 continues to step the ratchet 110 around until the notch 113*a* comes opposite the pin 114–2, at which time the energizing circuit for electromagnet 107 is broken at the pin 114–2, and the shaft 42 then remains stationary. The cam 41 is by this action set in a position to place the search head 20 in alignment with the second column of tapes in the cell.

The switch 105 is the tape selecting switch. It controls a stepper switch mechanism 118 generally similar to the stepper switch 106. Stepper switch 118 is operated by an electromagnet 119 which operates an armature 120 carrying a pawl 121 cooperating with a ratchet 122. The armature 120 is biased to a retracted position by a spring 123. A back contact 124 is opened concurrently with the attraction of armature 120 by electromagnet 119. Ratchet 122 is fixed on shaft 34, which also carries the stepped cam 33 cooperating with follower 31 to position the selector jaw 24. The shaft 42 also carries a disk 125 cooperating with a series of contact pins 126–1 to 136–10. A brush 127 is in continuous contact with the surface of disk 125.

The operation of the selector switch 105 to determine a position for the stepped cam 33 is analogous to the operation of switch 104 to determine a position of the stepped cam 41.

A switch 128 is connected between the selector switch 105 and the supply line L1. Switch 128 may be gang operated with the switch 116. These switches have a random position in which the selector switches are operated as just described, and a sequential position in which they function somewhat differently. The present description is concerned with the random operation only.

It is desirable that after a tape and a column selection have been made by the apparatus illustrated in FIGURE 20, that the apparatus in FIGURE 19 start on the seizing and reading cycle as soon as the tape selection is completed. It is also desirable that the tape seizing and reading mechanism then remain in its inactive position until the selection mechanism of FIGURE 20 has completed another tape selection. This specific sequence of operation is ensured by the mechanism described immediately below.

Connected in parallel with electromagnet 107 is a relay R3 having a front *a* contact and a back *b* contact. Similarly, a relay R4 is connected in parallel with electromagnet 119. Relay R4 also has a front *a* contact and a back *b* contact.

The *a* contacts of relays R3 and R4 are connected in parallel in an energizing circuit for a relay R5, having back *a* and *b* contacts. This circuit may be traced from supply line L1 through a random-sequential switch 129, now closed in its random position, a wire 132, parallel *a* contacts of relays R3 and R4, winding of relay R5 and a wire 131 to supply line L2. Relay R5 has a fast pickup, slow release characteristic so that its contacts remain picked up for a predetermined time after each energization of the winding of relay R5. At least one of the *a* contacts of relays R3 and R4 is intermittently closed and opened during each operation of one of the selector switches 104 and 105. Consequently, during each operation of the tape selection mechanism, relay R5 is picked up.

The circuit previously described as controlled by the *a* contact in column 7 of stepper switch 77 controls an energizing circuit for a relay R6 having separate pickup and holding windings. This circuit may be traced from line L1 in FIGURE 19 through wire 93, brush 79, contact *a* of column 7, a manual and automatic switch 130, which may be gang operated with switches 116, 128 and 129, and thence through a wire 130*a* to the pickup winding of relay R6 (FIGURE 20) and thence through a wire 131 to supply line L2.

Relay R6 operates a front contact *a* and a back contact *b*.

A holding circuit for relay R6 may be traced from supply line L1 in FIGURE 20 through switch 139, wires 132 and 133, back contact *a* of relay R5, front contact *a* of relay R6, the holding winding of relay R6 and thence through wire 131 to supply line L2.

It may be seen that relay R6 is picked up at the end of each seizing and reading cycle, when the stepper switch 77 passes position 7, and that it remains picked up by the energization of its holding winding until such time as relay R5 is again picked up. Relay R5 is picked up only when a selection of a different tape is made by movement of one or the other of selector switches 104 and 105, so that relay R6 can be de-energized only by the making of a new tape selection.

The *b* contact of relay R6 controls an energizing circuit for a relay R7 having an *a* contact connected in parallel with the push button 88 of FIGURE 19. The energizing circuit for relay R7 may be traced from supply line L1 through switch 129, wires 132 and 133, and thence through the back *b* contacts of relays R3, R4 and R5 in series, the back *b* contact of relay R6, and thence through the winding of relay R7, wire 131 and supply line L2.

This energizing circuit may be completed only at the end of a selection operation of the selector switches 104 and 105, and is effective to initiate a seizing and reading cycle in the same manner as the operation of push button 88 as described in connection with FIGURE 19. During a selection operation, the energizing circuit for relay R7 is always open at one or the other of the *b* contacts of relays R3, R4 and R5. It is opened at the beginning of the selection operation by the opening of one of the *b* contacts of relays R3 and R4, and is maintained open until the end of the selection by the opening of *b* contact of relay R5. Since the *b* contact of relay R6 closes during selection operation when relay R6 is de-energized, the energizing circuit for relay R7 is completed at the end of the selection operation and initiates the seizing and reading cycle. Relay R6 is picked up again at the end of the seizing and reading cycle, as described above, so that relay R7 cannot again become energized to initiate another seizing and reading cycle until a new selection is made.

*FIGURE 21—Sequential selection of tapes*

There is shown in this figure a stepper switch 134 including an electromagnet 135 operating an armature 136, on which is mounted a pawl 137 cooperating with a ratchet 138. Spring 139 biases the armature 136 to its de-energized position. Ratchet 138 is fixed on a shaft 140. Also fixed on the shaft 140 are two rotary brushes 141 and 142. Brush 141 cooperates with ten stationary contacts numbered respectively from 143–1 to 143–10. Brush 142 cooperates with a single stationary contact 144. Brush 141 is connected through a single pole double throw switch 145 to the supply line L1. Switch 145 is operable between a random position in which the switch is open and a sequential position in which the switch is closed. Switch 145 may be operated in gang with switches 116, 128, 129 and 130. The several contacts 143–1 to 143–10 are connected respectively to the pins 126–1 to 126–10 of FIGURE 20.

When operating to select, seize and read the tapes sequentially, all the random-sequential switches 116, 128, 129, 130, 145 and 153 are thrown to their sequential positions. The starting point for the sequential search must be determined manually, as in the procedure outlined under the random positioning operation described above. The first cycle of the sequential reading of the tapes is initiated by operating the push button 88. Near the end of that cycle when the stepper switch 77 closes its column 7 contacts, the C contact completes a circuit for energizing relay R2. This circuit has been described in connection with FIGURE 19. In addition to the *a* contact shown in FIGURE 19, relay R2 has *b* and *c* contacts illustrated in FIGURE 21. When relay R2 picks up, its *b* contact closes a pickup for a relay R8. This circuit may be traced from supply line L1 through the winding of relay R8 and a parallel capacitor 146, and thence through contact *b* of relay R2 and a wire 147 to supply line L2.

Relay R2 is energized only for a short time until the stepper switch 77 passes on to position zero. However, when relay R8 picks up, it establishes a holding circuit for itself. This holding circuit may be traced from line L1 through the winding of relay R8, back contact *b* of a relay R9, front contact *a* of relay R8 and thence through a wire 147 to supply line L2.

The winding of relay R9 is connected in parallel with a resistor 148 and in series with the anode 149 of a gas filled tube 150, which may be a type 2050 thyratron. The cathode 151 of thyratron 150 is connected through contact 152 of a switch 153*d* thence through contact *a* of relay R8 and wire 147 to supply line L2. Thyratron 150 has a control electrode 152 connected through a resistor 154 and a back contact *b* of relay R8 to the negative terminal of a biasing battery 155, whose positive terminal is connected to supply line L2. Control electrode 152 is also connected to supply line L2 through a pair of resistors 155 and 156, which are paralleled by the capacitor 157. Switch 153 is a random-sequential switch, which may be thrown in gang with the other random sequential switches. When in its sequential position, switch contact 152 is closed, and switch contact 158 is also closed. Since contact 152 is closed, thyratron 150 is ready for operation except that its control electrode 152 is biased negatively. When relay R8 picks up, its contact *b* disconnects the negative bias from control electrode 152. Capacitor 157 then becomes charged through the capacitance of the electrodes of the tube 150. When it becomes sufficiently charged, the tube 150 trips ON, energizing the relay R9, opening the holding circuit for relay R8 at its *b* contact and closing at its *a* contact a circuit which shunts the push button 88 in FIGURE 19. When relay R8 is de-energized, the cathode circuit of the thyratron 150 is interrupted and relay R9 is again de-energized.

Each time relay R2 is energized, its *c* contact completes an energizing circuit for electromagnet R135, which steps the ratchet 138 one notch, thereby moving the brush 141 to its next adjacent contact, and producing a following operation of rachet 118, disk 125 and cam 33. It may be seen that the electromagnet 135 is energized each time that a seizing and reading cycle is completed, so that after each reading cycle, the selecting mechanisms are operated to advance the selector jaw 24 by one tape position. After a certain time delay determined by the pick up time of relay R8 and the time required to charge capacitor 157, the relay R9 picks up and starts a new seizing and reading cycle for the newly selected tape. The time delays encountered in relay R8 and tube 150 are made great enough so that the selection may be accomplished after each reading cycle is completed and before the next one is started.

After the brush 141 has passed over its ten contacts, the ten tapes of one column have all been read. When brush 141 again passes to stationary contact 143–1, brush 142 engages contact 144, thereby completing an energizing circuit through wire 159 and switch 116 to electromagnet 107, thereby advancing the column selecting cam 41 one step, and shifting the search head to a new column so that the next seizing and reading cycle will follow with the first tape in the new column. In this manner, all the tapes in a particular cell may be read or written in sequence, without pausing between the reading of the tapes more than is necessary to shift the tape reading mechanism.

*FIGURES 22 to 25—Coarse positioning mechanism*

FIGURE 22 illustrates a tape storage unit including 70 tape storage cells, assembled in a group seven cells wide by ten cells high. The tape selecting mechanism described above is supported above this storage unit. The carriage 20 with search head 19 rides on a coarse positioning carriage 44. The carriage 44 is supported on a rail 160 and a lead screw 161, which extend the full width of the tape storage unit. These cells are enclosed within a suitable frame 162. Lead screw 161 is driven by a motor 169. The reel 160 and the lead screw 161 are supported at their left end on a carriage 163 and at their right end on a carriage 164. The carriage 163 is mounted for travel along a lead screw 165 driven by a motor 166. The carriage 164 is mounted for travel along a lead screw 167 connected by a chain 168, to lead screw 166, so that the lead screws 165 and 167 rotate synchronously.

Figure 24:
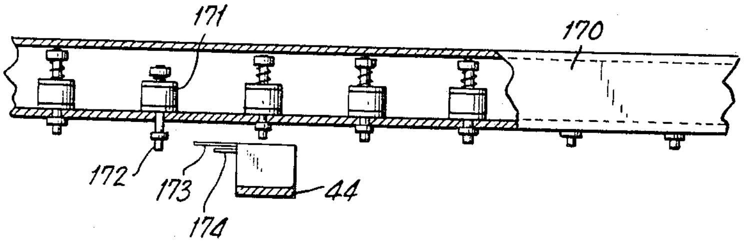
FIGURE 24 is a view partly in section along the line XXIV—XXIV of FIGURE 23 and partly in elevation; showing a detail of the coarse positioning mechanism.

Mounted on and extending between the carriages 163 and 164 is a bridge 170, shown in greater detail in FIGURE 24. The bridge 170 supports seven electromagnets, one of which is shown at 171. The electromagnets 171 operate armatures which drive downwardly extending pins 172. When a particular electromagnet is energized, its pin 172 is moved downward to the position shown in FIGURE 24. When a pin 172 projects downwardly in that manner, it lies in the path of a pair of switch actuating buttons 173 and 174 mounted on the carriage 44.

The number of electromagnets 171 corresponds to the number of columns of cells across the tape storage unit of FIGURE 22. The position of each pin 172 corresponds to a position in which the carriage 44 must stop in order to have the storage head 19 positioned correctly with respect to one of the columns of cells.

Figure 25:
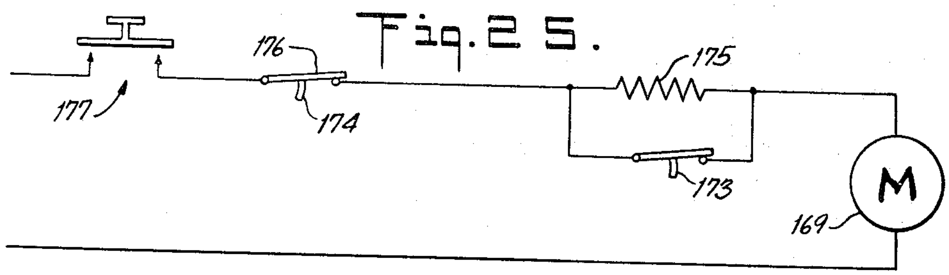
FIGURE 25 is a wiring diagram of a circuit for the coarse positioning mechanism of FIGURES 22 and 23.

As shown in FIGURE 25, the motor 169 is connected in series with a resistor 175 which is normally shunted by contact operated by the button 173. The circuit for motor 169 also extends through a switch 176 operated by button 174 and self-biased to closed position. The energizing circuit for motor 169 is also controlled by a manually operated switch which may be a push button switch 177. In order to select a particular column in the tape storage unit for reading, the motor 169 is first energized by a reversing circuit to drive the carriage 44 to the right of the column to be selected. The electromagnet 171 for that column is then energized, driving its pin 172 downwardly to the column selecting position. Switch 177 is then closed, and the motor 169 drives the carriage 44 rapidly toward the selected column until the button 173 strikes pin 172. At that time the shunt around resistor 175 is opened and the motor is substantially slowed by the insertion of this resistance in its circuit. The motor continues to run, however, until button 174 engages the pin 172*a*, whereupon the motor circuit is opened and the motor is stopped.

The lead screw 167 is mounted on blocks 178 and 179 located at opposite sides of the frame 162. A bridge 180 is also mounted on the blocks 178 and 179. The bridge 180 contains a position selecting mechanism similar to that of bridge 170 for controlling the position of the carriage 164 and thereby controlling the row selection mechanism. By the use of these two coarse position selecting mechanisms any particular cell in the 70 contained in the unit may be selected for a reading or writing operation. After the cell is selected, the particular tape or tapes within the cell to be read may be selected and read as described above.

Figure 29:
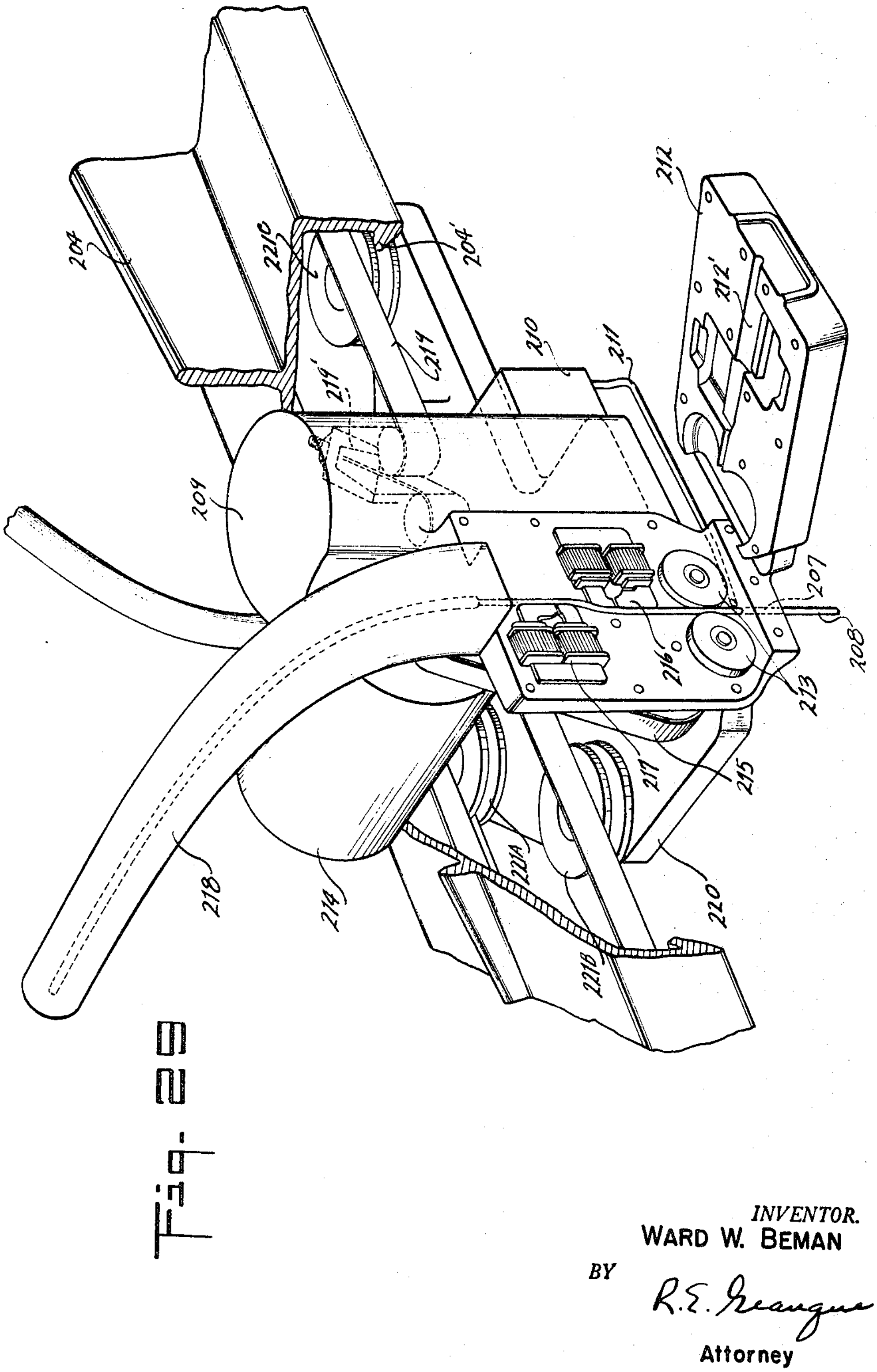
FIGURE 29 is an enlarged exploded perspective view of the search head of FIGURE 25 suitable for use with magnetizable wire and having certain parts shown in phantom or broken away to show the mounting and driving mechanisms.

While one embodiment of the invention has been illustrated, an alternative modification employing recordable filamentary record elements will now be described. There is shown in FIGURES 26, 27, 29 and 30 such an embodiment whereby filamentary record elements may be partially extracted from their spatial positions. In this embodiment, the search head, FIGURE 29, is positioned over the record filament to be extracted and the initial movement outward of the filament is instigated by a brief vacuum stroke which moves the record filament up sufficiently to engage it into a pair of drive rollers, which thereafter provide positive action past a record or write station. After the desired data have been read out (or written in), the drive rollers are reversed and the record filament is driven back into its normal position. Alternative means for extracting the record filament will be readily apparent to one skilled in the art. One embodiment can be achieved by the use of small diameter wires, longitudinally guided by the adjacent wires. Data may be recorded thereon by magnetizing the wires by well known means. Accurately positioned spacers are included between the rows of wires and column-length spacers are included to segregate the wires into smaller groups.

Since the volumetric capacity of such a storage unit is very great, it is unnecessary that anything approaching 100% efficiency need be striven for. Alternatively, the record filament may be in the form of an octagon so that four of the sides may be used to form guide surfaces, rubbing on adjacent filaments, whereas the other four sides would be employed to contain the stored data. Data would then be stored not only with X–Y–Z coordinates in its address, but with a "side determining" position of the address as well, since four separate and distinct sides are available for data storage.

*FIGURES 26–31—Three dimensional wire handling data storage apparatus*

Figure 26:
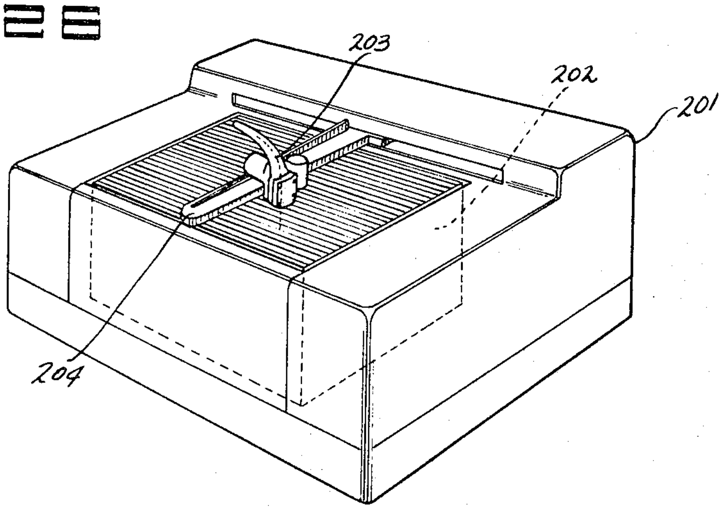
FIGURE 26 is a perspective view of a three-dimensional data storage apparatus showing the storage bins for supporting the filamentary record elements and the search head for selecting and partially withdrawing a given record element.

There is shown in FIGURE 26 a three-dimensional data storage apparatus comprising a frame structure 201 supporting a sectionally divided storage bin 202. A search head 203 is supported by means of a positioning arm 204 and is capable of being translated along two orthogonal axes. The driving mechanism for positioning the search head is identical to that described in the two-dimensional embodiment, which will be discussed later, shown in FIGURE 31.

Figure 27:
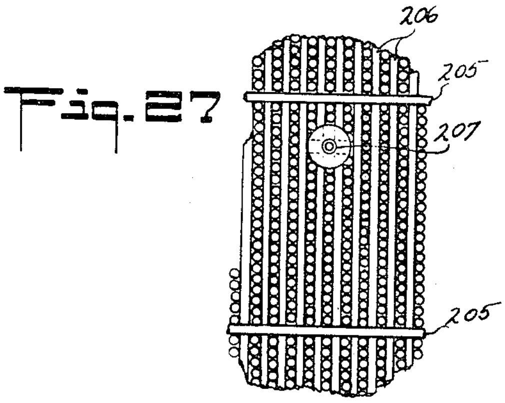
FIGURE 27 is an enlarged fragmentary, top plan view of a group of magnetizable wires showing the cell spacers and dividers and a certain selected wire.

The enlarged view of the storage bin 202 shown in FIGURE 27 illustrates the sectional dividers 205 and the spacers 206 which separate the magnetizable wires into groups for adequate support and convenient access. There is shown a selected wire as would be isolated by the orifice 207 at the bottom of the retrieval mechanism of FIGURE 29.

FIGURE 29 shows the interior and the mounting structure of the wire handling search head of the apparatus of FIGURE 26. The filamentary record element in the form of a magnetizable wire 208 is drawn into the head by means of a vacuum created by pump 209 and controlled by solenoid valve 210. The air in the search head is exhausted via tube 211. Cover 212 is shown removed for clarity but actually forms an air tight chamber in the assembled and operating mechanism. The inertia of the wire being pulled into the head carries it to drive rollers 213 which are driven by motor 214 through drive 215. A grooved channel 212′ guides the driver wire over read-write head 216 and erase head 217. Magazine 218 bends the wire at an angle to reduce the over-all height of the search head, and the length of the opening in the magazine will not permit the wire to be withdrawn completely from adjacent wires. Drive band 219 is attached to bracket 219′ on carriage 220 for the search head and is used to position the search head along one of two axes. The search head travels on three pulleys 221A, 221B, and 221C attached to carriage 220 and the pulleys in turn move along the inside edges 204′ of carriage arm 204.

Figure 28:
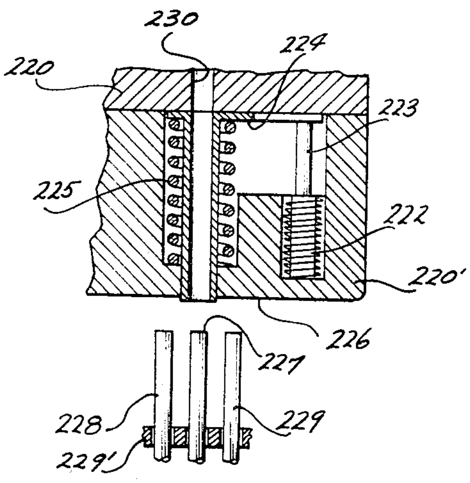
FIGURE 28 is a fragmentary cross sectional view showing a modified form of the wire withdrawing mechanism of FIGURE 29.

FIGURE 28 is a sectional view showing a modification of the search head of FIGURE 29 for improving the initial acquisition of the magnetizable wire. At the same time that solenoid valve 210 of FIGURE 29 is energized, the solenoid 222 of FIGURE 28 is also energized. This causes armature 223 to move downward with sleeve 224 to which it is attached. This action compresses spring 225 and also causes sleeve 224 to extend below the bottom surface of frame 226. The extended sleeve passes over the top of selected wire 227 and does not affect wires 228 or 229 since the wires for this modification are spaced from one another by a grid plate 229′. The various members of this modification are contained in a housing 220′ attached to the bottom of carriage 220 and the opening 230 in sleeve 224 is in line with orifice 207. The vacuum now existing in tube 230 will cause wire 227 to enter tube 230. At the conclusion of the wire handling cycle solenoid 222 is de-energized and spring 225 restores sleeve 224 to its retracted position, thereby enabling the search head to pass freely over the rows and columns of wires without interference.

Figure 30:
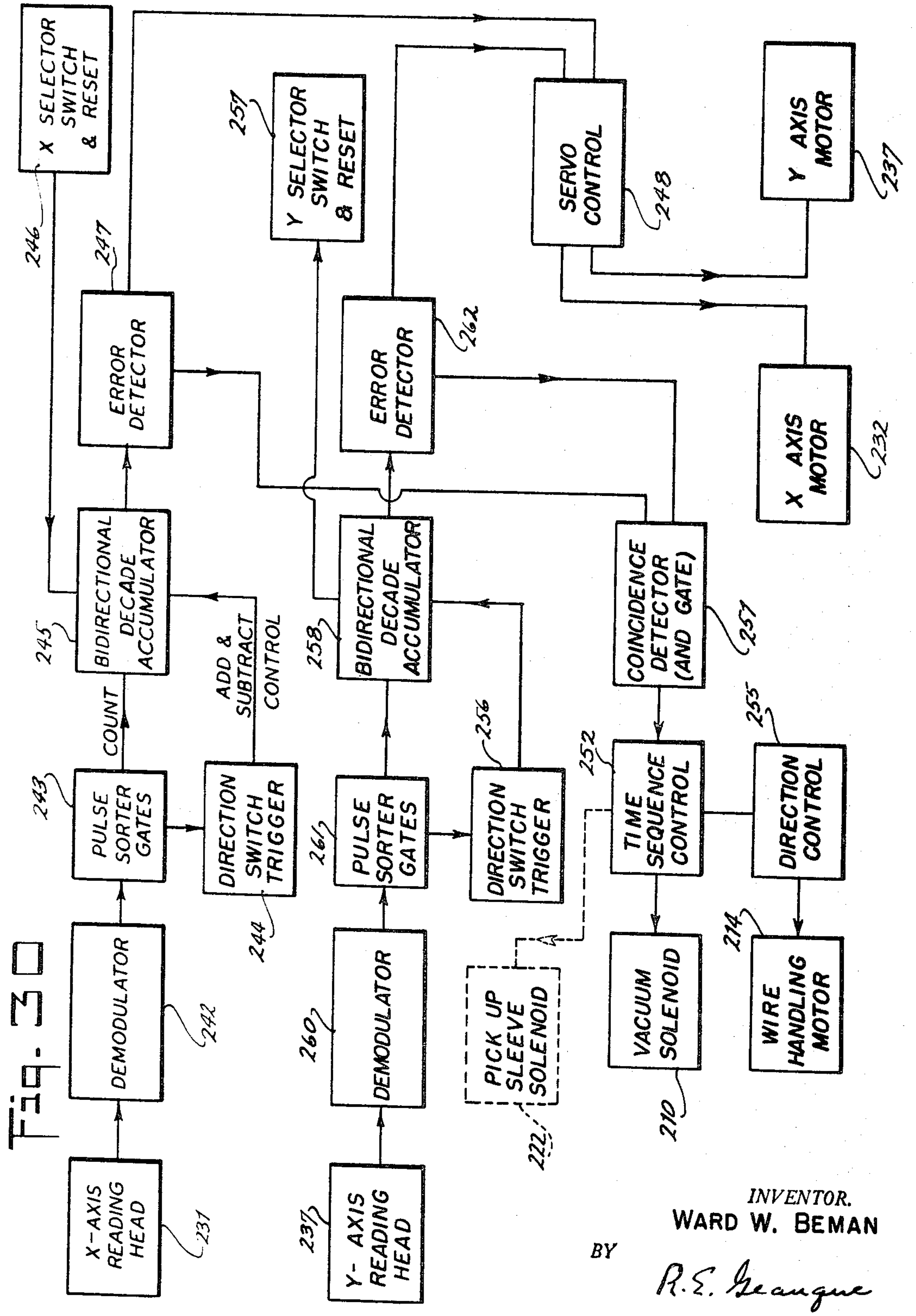
FIGURE 30 is a block diagram of the three-dimensional storage apparatus of FIGURE 1.

FIGURE 30 diagrammatically shows the circuit elements for performing the data record selection of the apparatus of FIGURES 26–29 and 31.

Figure 31:
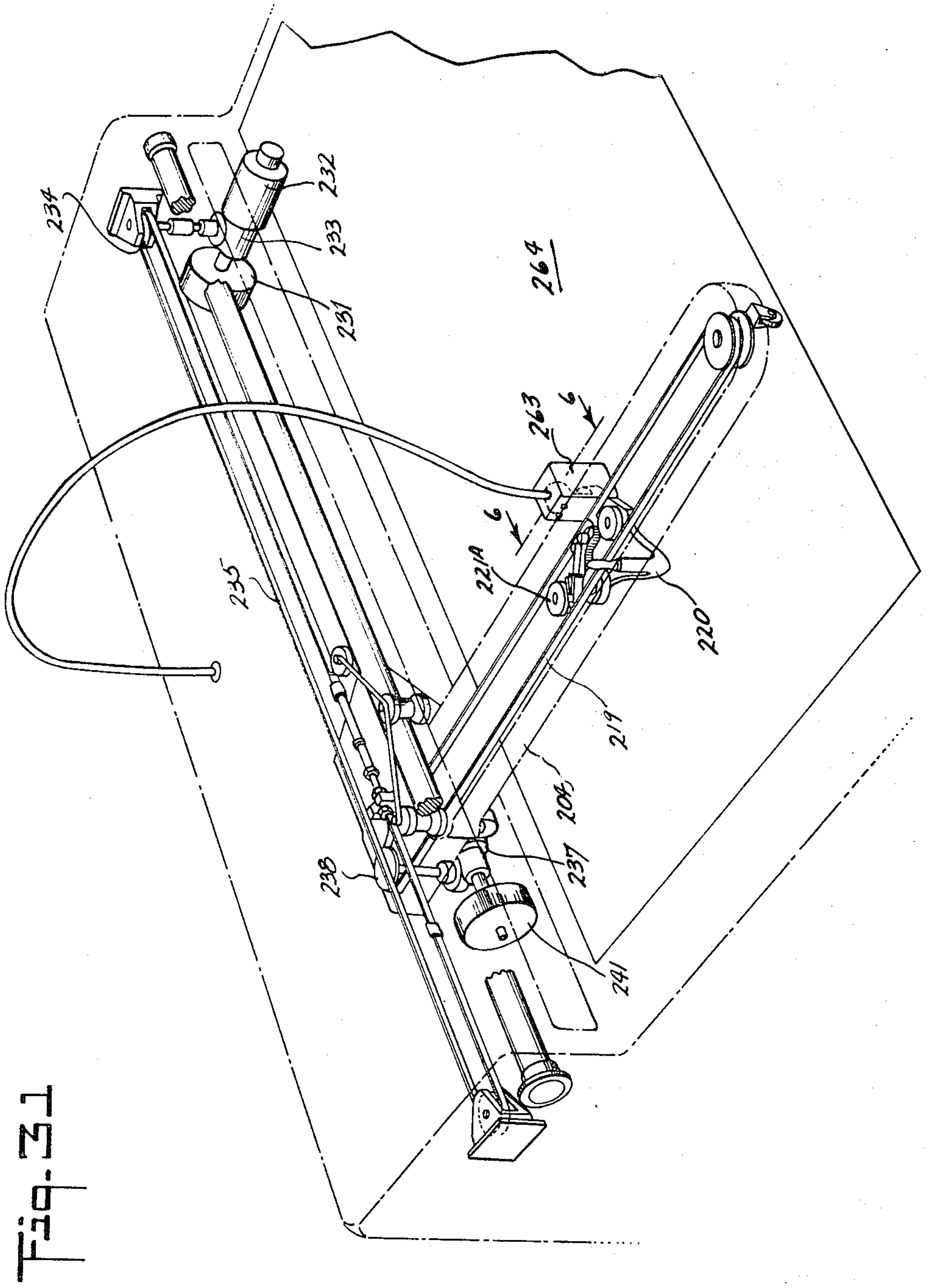
FIGURE 31 is a perspective view of a two-dimensional search head with certain parts shown in phantom or broken away to show the driving mechanism.

The sequence of operations of the apparatus will be first described with reference to FIGURE 31, showing the search head positioning mechanism. The coordination and handling of a selected magnetizable wire will then be described in connection with FIGURES 27, 28 and 29. Referring to FIGURE 31, the X-axis reading head 231 comprises a shaft position digitizer such as that described in U.S. Patent No. 2,765,459 issued to Arthur J. Winter. This shaft digitizer and its accompanying demodulator generates a train of electrical pulses whenever the X-axis drive motor 232 is in motion. The speed of the motor shaft is reduced through a right angle gear reduction 233 and through drive pulley 234. The rotation of drive pulley 234 causes the drive band 235 to translate the carriage 204 which supports the search head. The Y-axis drive motor 237 is simultaneously coupled to a pulley 238 and drive band 219 for causing translation of Y-axis carriage 220 in order to move the search head in an orthogonal direction. The motion of the carriage 220 along the Y-axis is sensed by the Y-axis reading head 241 which generates a train of pulses as the drive motor 237 rotates.

Referring now to FIGURE 30 the output from the demodulator 242 comprises two trains of square wave pulses which are supplied to the pulse sorter gates 243. By sensing the phase relationship between the two trains of square wave pulses, a signal is generated which either turns on or turns off the direction switch trigger 244. With the direction switch trigger turn on, an add control signal is generated. When the direction switch trigger is turned off, a subtract control signal is generated. One of the trains of square wave pulses from the pulse sorter gates is supplied directly to a bi-directional decade accumulator 245. The direction of accumulation (add or subtract) is controlled by the signal generated by the direction switch trigger 244.

The number standing in the bi-directional decade accumulator 245 may be pre-set by means of X-selector and reset switch 246. Whenever there is a number standing in the bi-directional decade accumulator which is larger than zero, a positive error signal will be generated and supplied to the error detector 247. Whenever the number standing in the bi-directional decade accumulator is less than zero, a negative error signal will be supplied to error detector 247. The output signal from the error detector comprises either a positive or negative drive control signal which is supplied to the servo control 248 and a parity signal which will be generated whenver the output from the error detector is neither positive nor negative but is, rather at zero.

The output from the servo control determines the speed and direction of the X and Y axes drive motors 232 and 237.

A similar circuit arrangement to that just described for the X-axis also exists for the Y-axis. The parity output signal from the error detector for the X and Y axes are supplied to coincidence detector ("and" gate) 251 which generates an "on" signal whenever a parity signal is received simultaneously from the X and Y axes error detectors. This "on" control signal operates the time sequence control 252. The time sequence control comprises a step-by-step programming circuit which operates the vacuum solenoid 210, wire handling motor 214 and its associated direction control 255 at appropriate times. In this way the record element may be drawn up into the search head and subsequently returned to the storage bin 202. If the embodiment of the invention employs the modification shown in FIGURE 28, then the time sequence control also operates pickup sleeve solenoid 222 at an appropriate time in the wire handling sequence.

Having now described the basic elements comprising the addressing and search head positioning system, a typical retrieval operation will now be analyzed.

The apparatus is reset to an initial condition by operating the X and Y reset switches 246 and 257. The address of the record element to be retrieved, in the form of Cartesian coordinates, is entered into the X and Y selector switches 246 and 257. The numbers entered into the selector switches establish numerical values in the bi-directional decade accumulators 245 and 258. Since the accumulators are no longer at zero, error signals will be generated which will set in motion the X-axis and Y-axis motors 232 and 237 through servo control 248. The motion of the motors will cause the X-axis and Y-axis reading heads 231 and 237 to generate trains of pulses which will operate the direction switch trigger 244 and 256 directly indicative of their coordinate position. The trains of pulses through demodulators 242 and 260 and pulse sorter gates 243 and 261 cause the numbers standing in accumulators 245 and 258 to be diminished as the heads move toward the defined address since the complement of the number pre-set into selector switches 246 and 257 corresponds to the number which will be generated by reading heads 231 and 237 when the intersection of the two coordinates is reached. The arrival of the X and Y axes reading heads at the addressed coordinate intersection will have reduced the pre-set numbers in the accumulators to zero and simultaneous parity signals generated by the error detectors 247 and 262, and the coincidence detector 251 will in turn activate the time sequence control 252.

The time sequence control first energizes the vacuum solenoid 210 and the pickup sleeve solenoid 222. This action will cause the wire directly beneath the search head to be drawn upwards into the drive rollers powered by the wire handling motor 214. The wire handling motor is driven in such a direction by the direction control as to cause the wire to be propelled into the mechanism and over the heads at the read-write station. After a given time has elapsed, as determined by the time sequence control 252, the direction control will be reversed and cause the wire handling motor 214 to reverse and withdraw the wire from the magazine 218 and propel it back into the storage bin. The time sequence control then becomes deactivated and the apparatus is ready for a new cycle of operation.

Figure 32:
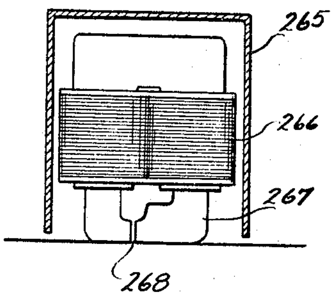
FIGURE 32 is an elevational view of the two-dimensional read-write head of FIGURE 30 with the case shown in section.
Figure 33:
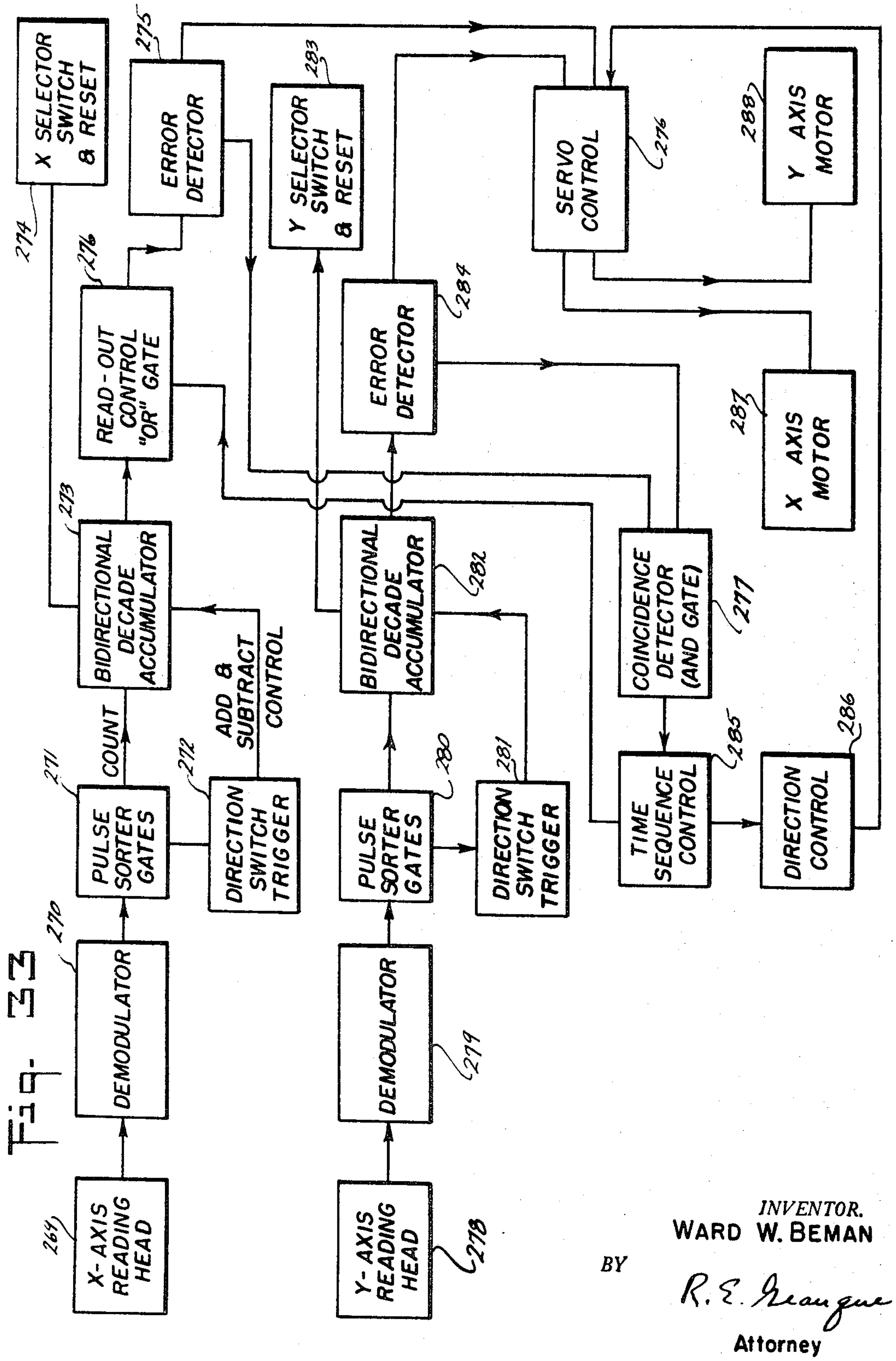
FIGURE 33 is a block diagram of the two-dimensional data storage apparatus of FIGURE 4.

*FIGURES 31, 32, and 33—A two-dimensional data storage and handling apparatus*

Still another embodiment of the invention might be employed in those cases in which the very large capacity of a three-dimensional storage device are not required thereby permitting a simplification of the record element storage selector and retrieval mechanism to provide a two-dimensional random access data storage apparatus. There is shown in FIGURES 31, 32 and 33 those elements, which differ from previously described embodiments and which result in a device whereby a plurality of elongate record elements, arranged side by side in a planar array, may be randomly selected and scanned for the purpose of reading or writing thereon.

In this embodiment, the search head 263 shown in FIGURE 31 is positioned over the recordable surface 264 along orthogonal coordinates. The motion of the search head 264 is affected by a mechanism identical that described previously in connection with FIGURE 31. The search head proper comprises a supporting frame 265 and a reading head and a writing head only one of which is shown in the sectional drawing, FIGURE 32. Both the reading head and writing head employ a coil 266 and a magnetic core structure 267 having a very small gap 268 between the poles of the core. One head may be used to record or "write" on a magnetizable surface in a conventional manner, as is well known in the magnetic recording art, and a reading head is so aligned as to permit it to play back or "read" the data track written by the the write head.

The starting location of the search head for reading or writing is determined by the positioning of the drive mechanism in accordance with a pre-set numerical address. FIGURE 33 diagramatically shows the circuit elements affecting the address position of the search head.

Referring now to FIGURE 33, the X-axis reading head 269 will generate a pair of pulse trains whenever the X-axis servo motor is in motion. These trains of pulses are supplied to a demodulator 270 which in turn supplies suitable square wave pulses to the pulse sorter gates 271, which by sensing the phase relationship between the two trains of pulses, provide a signal which in turn will operate the direction switch trigger 272 to supply either an add or a subtract control signal to the bi-directional decade accumulator 273. One of the trains of pulses from the pulse sorter gates is supplied directly to the input of the bi-directional decade accumulator. This pulse train is added or subtracted into the accumulator as determined by the add or subtract control signal generated by the direction switch trigger.

An address number may be pre-set into the bi-directional decade accumulator by means of the X-selector switch and re-set 274. This address number will ultimately cause the search head to become positioned at a corresponding X-coordinate.

Whenever a number larger than zero is standing in the bi-directional accumulator, a positive error signal will be generated and supplied to the error detector 275 through the read-out control "or" gate 276 which is normally open. Whenever the number standing in the bi-directional decade accumulator is less than zero, a negative error signal will be supplied through the normally open read-out control "or" gate to the error detector.

The error detector supplies an output signal on one of two output lines as determined by the existence or absence of an error signal. If either a positive or negative error signal exists, it will be sent on to the servo control 276 on one of the two output lines from the error detector. If neither positive nor a negative error signal exists, then a parity signal will be supplied to the coincidence detector ("and" gate) 277.

A similar circuit arrangement to that just described for the X-axis control of the search head also exists for the Y-axis and comprises a Y-axis reading head 278, a demodulator 279, pulse sorter gates 280, direction switch 281, bi-directional accumulator 282, Y-selector switch and reset 283, and error detector 284. The parity output signal from the Y-axis error detector 284 is also supplied to the coincidence detector 277 whenever two parity signals are received simultaneously from the X- and Y-axis error detectors and an "on" signal will be generated and supplied to the time sequence control 285. The time sequence control comprises a sequential programming circuit which operates the read-out control "or" gate 276 and direction control 286. The signal from the time sequence control to the read-out control "or" gate operates to close the gate and thereby inhibit the signals from the bi-directional decade accumulator 273 from reaching the error detector 275. Subsequently, the time sequence control 285 supplies a signal to the direction control 286 which determines the required directional motion of the search head for providing data translation.

The directional control signal from the direction control is supplied to the servo control 276. The servo control determines the motion of the X-axis motor 287 and the Y-axis motor 288.

Having now described the elements comprising the addressing and search head positioning system for the two dimensional data handling apparatus, a typical retrieval operation will now be described.

The apparatus is reset to an initial condition by means of the X and Y reset switches 274 and 273. The location of the data to be retrieved is defined by Cartesian coordinates which are entered into the X and Y selector switches 274 and 273. By means of these switches, a numerical value is entered into each of the two bi-directional decade accumulators 273 and 282. The existence of numbers other than zero in the accumulators will cause an error signal to be generated via the error detectors 275 and 274 which will in turn set in motion the X-axis motor 287 and Y-axis motor 288 by means of the servo control 276. The motion of the motors will cause the X-axis and Y-axis reading heads 269 and 278 to generate trains of pulses through the demodulators 270 and 279. The pulses received by the bi-directional decade accumulators 273 and 282 from the demodulators through the pulse sorting gates 271 and 280 will cause the numbers standing in the accumlators to diminish as the search head moves towards the preset coordinates address. When the intersection of the two coordinates is reached, the algebraic complement of the numbers preset into the X-selector switch 274 and the Y selector switch 283 will have reduced the numbers in the accumulators to zero and simultaneous parity signals will be generated by the error detector 274 and 275, which will in turn activate the coincidence detector 277. The coincidence detector will activate the time sequence control 285. The time sequence control will first close the read-out control "or" gate to inhibit further error control signals from reaching the servo control. The time sequence control will then activate the direction control 286 which will in turn operate the servo control to cause the appropriate drive motor, X-axis motor or Y-axis motor, to move along the desired recording paths. The read or write head will, in this way be moved relative to the recordable surface containing the recording data. The time sequence control will then de-activate the direction control after a predetermined time has elapsed and the apparatus will be ready for a new cycle of operation.

In all of the described embodiments of the invention, the data may be recorded on the recordable element by any of several well known methods; for example, the data tracks can be of variable area or may be of variable density it being understood that the variations in the area of the tracks, the variation in the density of the tracks, or variations in the magnetic saturation as the case may be, are truly representative of the data recorded.

It should be understood that the record elements need not necessarily be magnetizable, but may be photographic, ferro-electric or employ other types of recording media. For example, one embodiment of the present invention may employ tapes on, or in which dielectric particles with ferro-electric properties are provided, these particles being adapted to be readily polarized or de-polarized or changed in their piezo-electric properties under the action of electrostatic forces. In this way, the intra- and inter-molecular structure of the recordable element may be spontaneously and permanently changed according to the intelligence to be stored thereon. Alternatively, the movement of a record element having a variable area or variable density data track through the field of an electrostatic pickup or read-head will produce fluctuations or pulsations in the circuit of the read-head corresponding to the recorded data. Such data tracks may be formed of metallic or partially metallic material as may be produced photographically, in which case the metallic silver of the tracks is sufficient to properly influence or affect an electrostatic read-head. Alternatively, such a data track may be read by photoelectric means. Modifications of the embodiments described will readily occur to those skilled in the art, and it is therefore intended that the invention shall be limited only by the appended claims.

What is claimed is:

1. Data storage apparatus, comprising:
a plurality of elongated records,
means for mounting said records in a matrix having X and Y axes with each record having an X and Y coordinate address, said records being mounted substantially parallel to each other,
transducer means for recording or reading data with respect to said records,
first positioning means for moving said transducer means with respect to said X axis,
second positioning means for moving said transducer means with respect to said Y axis,
means operable when said transducer means is in an operable relationship with a preselected record for withdrawing only said preselected record from said plurality of records in a direction generally transverse to said X and Y axes, said withdrawing means including vacuum means for applying a force to said preselected record, and
means operable while said preselected record is being withdrawn for moving at least a portion of said preselected record past said transducer means.

2. Data storage apparatus according to claim 1, including means for returning said preselected record to its initial storage position after said portion has been moved past said transducer means.

3. Data storage apparatus according to claim 2, wherein said means for moving said preselected record includes friction drive means and wherein said returning means includes means for reversing the direction of movement of said friction drive means to return said preselected record to its original position.

4. Data storage apparatus according to claim 2, including a carriage, said transducer means, withdrawing means, and moving means being mounted on said carriage, said first and second positioning means being adapted to move said carriage.

5. Data storage apparatus according to claim 4, including means for restraining the records adjacent said preselected record from movement along said perpendicular axis.

6. Data storage apparatus according to claim 5, including temporary record storage means mounted on said carriage, and means for guiding said record past said transducer means into said temporary record storage means.

7. Data storage apparatus according to claim 6, wherein said X and Y axes define a substantially horizontal plane with said records being suspended vertically.

8. Data storage apparatus, comprising a stationary storage cell, a plurality of flexible magnetic tapes arranged in said storage cell in a substantially parallel relationship, means for vertically hanging said tapes, transducer means for recording data on and reading data from said tapes while said transducer means is in a stationary position with respect to said storage cell, and means for causing a preselected tape to be moved along a fixed path from its position in said storage cell past said transducer means and back to said storage cell, said means for causing including at least one rotatable drive member for engaging said preselected tape and moving said preselected tape at a predetermined rate of speed relative to said stationary transducer means sufficient to read data from and record data on said preselected tape.

9. Data storage apparatus according to claim 8, including means for restraining at least the two tapes adjacent said selected tape from movement during movement of said selected tape.

10. Data storage apparatus comprising a multiplicity of data bearing tapes, each of said tapes having a seizable tab at one end thereof, and rectangular frame means supporting said tapes in closely packed columnar relation with the tabs of all the tapes in distinctive positions, said supporting means including means holding said tapes in tight frictional engagement with one another near said tab ends, and holding other portions of said tapes loosely.

11. Data storage apparatus comprising a multiplicity of data bearing tapes, each having a seizable tab at one end and at its other end a taper along one side and a notch in the other side, the depth of said taper being at least as great as the depth of said notch, means supporting said tapes in closely packed relation with the tabs of all the tapes in distincitve positions and with the tapered and notched sides of adjacent tapes facing in opposite directions, and means for restraining each tape from movement with respect to an adjacent tape, said restraining means including a pair of spring loaded follower means biased into engagement with the notches on the opposite sides of the closely packed tapes.

12. Data storage apparatus comprising a multiplicity of data bearing tapes arranged in stacked relation in a multiplicity of columns, each column including a plurality of tapes, each tape having a seizable tab projecting from one end thereof, with each tab associated with a single column located at a distinctive lateral position with respect to the other tabs in said single column, tab seizing means located exteriorly of said tapes and comprising at least one movable member for engaging said tabs, means for shifting said tab seizing means along said stacked tapes to bring it into alignment with a preselected column of tapes, and means for shifting at least a portion of said tab seizing means laterally with respect to said column to bring it into alignment with the tab of a particular tape in the column.

13. Data storage apparatus comprising a multiplicity of data bearing tapes, each tape having a seizable tab, means supporting said tapes in closely packed relation with the tabs of all the tapes in distinctive positions, tab seizing means located exteriorly of said packed tapes and comprising at least one movable member for engaging said tabs, means for positioning said tab seizing means selectively to seize the tab of a particular tape, and means including said tab seizing means for driving a seized tape away from the other tapes and into engagement with said driving rollers.

14. Data storage apparatus as defined in claim 13, including means effective after a predetermined length of tape has passed through the rollers to reverse the rollers and thereby drive the tape back toward its initial position.

15. Data storage apparatus as defined in claim 14, including restoring means effective after the tape leaves the driving rollers to complete the restoration of the tape to its initial position.

16. Data storage apparatus comprising a plurality of data bearing tapes, means supporting said tapes in closely packed relation, a data translating head, a search head, a pair of jaws mounted on said search head, at least one of said jaws being pivoted for movement with respect to the other, means for moving said search head to bring said jaws into alignment with one of said tapes, means for moving said one jaw to seize a tape, means for moving the search head away from the tape supporting means while a tape is seized to withdraw the seized tape from the tape supporting means, means for releasing said jaw after the tape is withdrawn from said tape supporting means, and two tape driver rollers mounted on said search head and aligned with said jaws and effective to engage the end of the withdrawn tape after the jaws are released and the search head is moved back toward the tape supporting means, said data translating head being mounted in alignment with said rollers and effective to translate data with respect to said tape as the tape is driven past the data translating head by the rollers.

17. Data storage apparatus as defined in claim 16, including a magazine on the opposite side of said data translating head from said rollers and effective to receive and hold the tape passing the data translating head.

18. Data storage apparatus comprising a multiplicity of data bearing tapes, each having a seizable tab at one end thereof, means supporting said tapes in closely packed relation with the tabs of all the tapes in distinctive positions, tape driving means including a frame movable toward and away from said tape supporting means, tape seizing means mounted on said frame and operable between seizing and releasing positions, a pair of tape driving rollers; means for moving said frame toward said tape supporting means, means for operating said tape seizing means to seize a particular tape, means for moving the frame away from the tape supporting means and thereby moving the seized tape away from the other tapes, means for releasing said seized tape, means for moving the frame back toward the tape supporting means to bring the selected tape into engagement with the driving rollers, means for driving said rollers in a direction to pull the tape out of the tape supporting means until a predetermined length of tape has passed the rollers, and means for reversing the rollers to drive the tape back to its original position; and means effective after the tape has reached its original position to shift said tape driving means so as to bring said tape seizing means into alignment with the tab of an adjacent tape, said last named means being effective after the tape seizing means is aligned with said adjacent tape to initiate operation of said sequence control means.

19. Data storage apparatus comprising means for storing a plurality of magnetizable wires in closed packed relationship with exposed ends in a continuous surface, a search head, means for moving said search head over said exposed ends of said wires, a wire passage through said search head connecting at one end with a suction opening in the side of said head adjacent the ends of said wires, suction means connected with said head to produce a vacuum at said opening, drive means located within said head adjacent said passage, data translating means positioned adjacent said passage, and control means for controlling said head moving means to position said opening over the end of a selected wire and for actuating said suction means and drive means to move said selected wire from its stored position past said data translating means and return it to stored position.

20. Data storage means as defined in claim 19, wherein said head moving means comprises a carriage supported by a carriage arm for movement in one direction, means for supporting said carriage arm for movement in another direction, and power means for moving said carriage arm and carriage.

21. Data storage apparatus comprising means for storing a plurality of single record filaments in closely packed relationship with exposed ends, head means located adjacent said exposed ends, power means for moving said head means over said exposed ends, means carried by said head means for moving a single filament relative to the remaining filaments, data translating means located adjacent the path of movement of said single filament, and control means for controlling said power means to locate said filament moving means in position to move a selected single filament and for actuating said filament moving means to move said selected filament past said data translating means after positioning of said filament moving means.

22. Data storage apparatus comprising a plurality of single record filaments, means for storing said filaments in closely packed relationship with exposed ends, head means located adjacent said exposed ends, power means for moving said head means over said exposed ends to select a single filament, suction means in the side of said head means adjacent the exposed ends of said filaments for moving a selected filament into said head means, said suction means comprising a movable sleeve having an opening therethrough, a vacuum source connected with said opening, and means for moving said sleeve over the exposed end of said selected filament.

23. Data storage apparatus as defined in claim 22, wherein said storage means comprises a grid means having a plurality of spaced openings with each opening receiving a filament, said grid means positioning said exposed ends apart a sufficient distance to permit said sleeve to move over the exposed end of the single selected filament.

24. Data storage apparatus as defined in claim 22 having a filament passage in said head means in line with said opening in said sleeve, drive means located adjacent said passage for engaging and driving said selected filament upon movement of said filament by said suction means.

25. Data storage apparatus as defined in claim 24 having control means for controlling said power means to position said sleeve over a selected filament and for actuating said sleeve moving means and said drive means while said sleeve is in position over said selected filament.

26. A data storage device comprising a plurality of flexible elongated data bearing records each having two ends, means for freely supporting said elongated records along the length thereof in all planes transverse to the longitudinal axis, means located in a fixed position adjacent one of the ends of said records for transducing data with respect thereto, feeding means fixed intermediate said transducing means and said one of the ends of the records and adapted to receive while in the fixed position any one of the records and feed the same in cooperative relationship with said transducer for a transducing operation and subsequently return for support with at least a portion of said records remaining in contact with said supporting and said feeding means, and record advancing means having a selectively operable record advancing device associated with each record to advance the same to said feeding means.

27. Data storage apparatus comprising a plurality of data bearing tapes, means for supporting said tapes in distinctive positions, a magazine for receiving a predetermined length of tape, said magazine being adapted to cause said tape to be coiled about itself, means for selecting one of said tapes, means for driving a predetermined length of the selected tape from said tape supporting means to said magazine and for returning said tape to said tape supporting means, a read-write head located between said tape supporting means and said magazine on the patch of movement of said tape, and tape guide means, said tape supporting means, said tape guide means and said magazine cooperating to maintain alignment of the tape with said read-write head during its movement in at least one direction.

References Cited

UNITED STATES PATENTS

| | | | |
|---|---|---|---|
| 2,080,100 | 5/1937 | Taushek | 340—174.1 |
| 2,386,520 | 10/1945 | Watson | 129—16.1 |
| 2,535,609 | 12/1950 | Spellman | 312—19 |
| 2,562,593 | 7/1951 | Adams | 312—186 |
| 2,563,957 | 8/1951 | Plack | 129—16.1 |
| 2,597,866 | 5/1952 | Gridley | 340—174.1 |
| 2,638,215 | 5/1953 | Friedenwald | 129—16.1 |
| 2,650,830 | 9/1953 | Potter | 340—174.1 |
| 2,702,380 | 2/1955 | Brustman | 340—174.1 |
| 2,722,676 | 11/1955 | Begun | 340—174.1 |
| 2,842,754 | 7/1958 | Luhn | 340—174.1 |

BERNARD KONICK, *Primary Examiner.*

A. I. NEUSTADT, *Assistant Examiner.*

UNITED STATES PATENT OFFICE
CERTIFICATE OF CORRECTION atent No. 3,413,628 November 26, 1968

Ward W. Beman

It is certified that error appears in the above identified patent and that said Letters Patent are hereby corrected as shown below:

Column 5, line 40, "machanism" should read -- mechanism --. Column 7, ine 47, "rotating" should read -- rotation --. Column 11, line 57, "position" hould read -- portion --. Column 13, line 18, "126-1 to 136-10" should read - 126-1 to 126-10 --; line 74, "switch 139" should read -- switch 129 --. olumn 14, line 72, after "pickup" insert -- circuit --. Column 17, line 11, position" should read -- portion --. Column 18, line 32, "turn" should read - turned --. Column 26, line 10, "patch" should read -- path --.

Signed and sealed this 31st day of March 1970.

(SEAL)
Attest:

Edward M. Fletcher, Jr.
Attesting Officer

WILLIAM E. SCHUYLER, JR.
Commissioner of Patents